US011029691B1

(12) United States Patent
Barboi et al.

(10) Patent No.: US 11,029,691 B1
(45) Date of Patent: Jun. 8, 2021

(54) NONHOLONOMIC ROBOT FIELD COVERAGE METHOD

(71) Applicant: Left Hand Robotics, Inc., Longmont, CO (US)

(72) Inventors: Mickey Barboi, Fort Collins, CO (US); Nevin Gilbert, Longmont, CO (US); Eesam Hourani, Denver, CO (US); Terry Olkin, Niwot, CO (US)

(73) Assignee: LEFT HAND ROBOTICS, INC., Longmont, CO (US)

( * ) Notice: Subject to any disclaimer, the term of this patent is extended or adjusted under 35 U.S.C. 154(b) by 0 days.

(21) Appl. No.: 16/847,223

(22) Filed: Apr. 13, 2020

Related U.S. Application Data

(60) Provisional application No. 62/965,026, filed on Jan. 23, 2020.

(51) Int. Cl.
    *G05D 1/02*     (2020.01)
    *G05D 1/00*     (2006.01)
    (Continued)

(52) U.S. Cl.
    CPC .......... *G05D 1/0212* (2013.01); *G05D 1/0088* (2013.01); *G05D 1/0268* (2013.01);
    (Continued)

(58) Field of Classification Search
    CPC .. G05D 1/0212; G05D 1/0088; G05D 1/0268; G05D 2201/02; G05D 1/0219;
    (Continued)

(56) References Cited

U.S. PATENT DOCUMENTS 6,604,005 B1 * 8/2003 Dorst .................... B25J 9/1666
    700/56
7,010,425 B2     3/2006 Gray et al.
(Continued)

FOREIGN PATENT DOCUMENTS

WO     WO 2016/098023 A2     6/2016

OTHER PUBLICATIONS

PCT/US2020/027976 International Search Report and Written Opinion dated Jul. 30, 2020, 11 pp.
(Continued)

*Primary Examiner* — Yazan A Soofi
(74) *Attorney, Agent, or Firm* — Lathrop GPM LLP

(57) ABSTRACT

A software product and methods determine a field coverage method for a nonholonomic robot to process a field using parallel lanes. A cellular decomposition algorithm divides the field into a plurality of cells, each having a plurality of parallel lanes. Permutations of lane processing orders are determined for each cell, based upon a minimum turning radius of the robot. A cell graph is generated to determine a shortest path for single-time processing each lane in each cell without violating the minimum turning radius of the robot. A step list defining movement of the nonholonomic robot along each lane in each cell of the shortest path through the cell graph is generated, and transits between the lanes, and laps around the field and any obstacles are added. A path program to control the nonholonomic robot to process the field is generated based upon the step list.

20 Claims, 22 Drawing Sheets

(51) Int. Cl.
*B25J 5/00* (2006.01)
*B25J 9/16* (2006.01)
*B25J 11/00* (2006.01)

(52) U.S. Cl.
CPC .. *B25J 5/00* (2013.01); *B25J 9/16* (2013.01); *B25J 9/1664* (2013.01); *B25J 9/1666* (2013.01); *B25J 11/00* (2013.01); *G05D 2201/02* (2013.01)

(58) Field of Classification Search
CPC ... G05D 1/0274; B25J 5/00; B25J 9/16; B25J 9/1664; B25J 9/1666; B25J 11/00
USPC .......................................................... 701/23
See application file for complete search history.

(56) References Cited

U.S. PATENT DOCUMENTS

| | | | |
|---|---|---|---|
| 9,554,508 | B2 | 1/2017 | Balutis et al. |
| 9,573,275 | B2 | 2/2017 | Reigo et al. |
| 9,720,417 | B2 | 8/2017 | Reigo et al. |
| 9,826,678 | B2 | 11/2017 | Balutis et al. |
| 10,159,180 | B2 | 12/2018 | Balutis et al. |
| 10,390,483 | B2 | 8/2019 | Balutis et al. |
| 10,598,793 | B2 | 3/2020 | Ohrlund et al. |
| 10,646,997 | B2 | 5/2020 | Reigo et al. |
| 10,776,639 | B2 * | 9/2020 | Steinberg ................ G01S 17/58 |
| 10,777,000 | B2 | 9/2020 | Grufman et al. |
| 10,806,075 | B2 | 10/2020 | Grufman et al. |
| 10,816,993 | B1 * | 10/2020 | Tran ..................... G05D 1/0088 |
| 10,849,267 | B2 | 12/2020 | Strandberg et al. |
| 2006/0293792 | A1 * | 12/2006 | Hasegawa ............ G05D 1/0274 700/245 |
| 2012/0143372 | A1 * | 6/2012 | Roh .................... G05D 1/0274 700/255 |
| 2014/0180478 | A1 | 6/2014 | Letsky |
| 2016/0091898 | A1 | 3/2016 | Booher |
| 2016/0195875 | A1 | 7/2016 | Tjeerdsma et al. |
| 2019/0003137 | A1 * | 1/2019 | Gao ........................ E01H 1/00 |
| 2019/0025838 | A1 | 1/2019 | Artes et al. |
| 2019/0195875 | A1 * | 6/2019 | Sand ..................... C07K 14/78 |
| 2019/0266418 | A1 * | 8/2019 | Xu ..................... G06K 9/00798 |
| 2019/0314991 | A1 * | 10/2019 | Liu ........................ B25J 9/1666 |
| 2020/0029490 | A1 * | 1/2020 | Bertucci .............. G06K 9/6202 |
| 2020/0133274 | A1 * | 4/2020 | Kim .................... G05D 1/0088 |
| 2020/0225673 | A1 * | 7/2020 | Ebrahimi Afrouzi ....................... A47L 9/2857 |

OTHER PUBLICATIONS

Acar et al. (2008) "Path Planning for Robotic Demining: Robust Sensor-based Coverage of Unstructured Environments and Probabilistic Methods," The International Journal of Robotics Research, vol. 22, No. 7-8, Jul.-Aug. 2003, pp. 441-466.

Arkin et al. (1993) "Approximation Algorithms for Lawn Mowing and Milling," Proc. 5$^{th}$ Canada Conf. Comput. Geom., Waterloo, Canada, 23 pp.

Choset et al. (1997) "Coverage Path Planning: The Boustrophedon Decomposition" Conference Paper, Proceedings of International Conference on Field and Service Robotics, pp. 216-222.

Driscoll et al. (2011) "Complete coverage path planning in an agricultural environment," Graduate Theses and Dissertations of Iowa State University, 12095, 71 pp.

Galceran et al. (2013) "A Survey on Coverage Path Planning for Robotics," University of Girona Underwater Robotics Research Center (CIRS), Pie de Peguera, 13, 17003 Girona (Catalonia, Spain), 37 pp.

Han et al. (2013) "Development of a Path Generation and Tracking Algorithm for a Korean Auto-guidance Tillage Tractor," J. of Biosystems Eng. 38(1), pp. 1-8.

Horvath et al. (2018) "Robot Coverage Path Planning Based on Iterative Structured Orientation," Acta Polytechnica Hungarica vol. 15, No. 2, 19 pp.

Jan et al. (2014) "A Computationally Efficient Complete Area Coverage Algorithm for Intelligent Mobile Robot Navigation," 2014 International Joint Conference on Neural Networks (IJCNN), Jul. 6-11, 2014, Beijing, China, 7 pp.

Jin (2009) "Optimal field coverage path planning on 2D and 3D surfaces," Graduate Theses and Dissertations of Iowa State University, 11054, 153 pp.

Kabir et al. (2015) "Path planning for autonomous lawn mower tractor," CNU Journal of Agricultural Science, vol. 42, No. 1, pp. 63-71.

Kapoutsis et al. (2017) "DARP: Divide Areas Algorithm for Optimal Multi-Robot Coverage Path Planning," Department of Electrical and Computer Engineering, Democritus University of Thrace, Xanthi Greece & Information Technologies Institute, CERTH Thessaloniki, 16 pp.

Oksanen (2007) "Path planning algorithms for agricultural field machines," Helsinki University of Technology Automation Technology Laboratory Series A: Research Reports No. 31, Espoo, Dec. 2007, 112 pp.

Plessen (2018) "Partial Field Coverage Based on Two Path Planning Patterns," IMT School for Advanced Studies Lucca, Piazza S. Francesco, 19-55100 Lucca, Italy, 44 pp.

Waanders et al. (2011) "Coverage Path Planning for Mobile Cleaning Robots," 15thTwente Student Conference on IT, Jun. 20, 2011, Enschede, The Netherlands, 10 pp.

Xu et al. (2013) "Efficient complete coverage of a known arbitrary environment with applications to aerial operations," Autonomous Robots, vol. 35, No. 4, 19 pp.

European Patent Application No. 17874466.0, Extended Search and Opinion dated Nov. 9, 2020, 16 pages.

* cited by examiner

Step 1: Fit Circle | Step 2: Retract Edges to Circle Tangents | Step 3: Take Arc of Circle Between Tangents

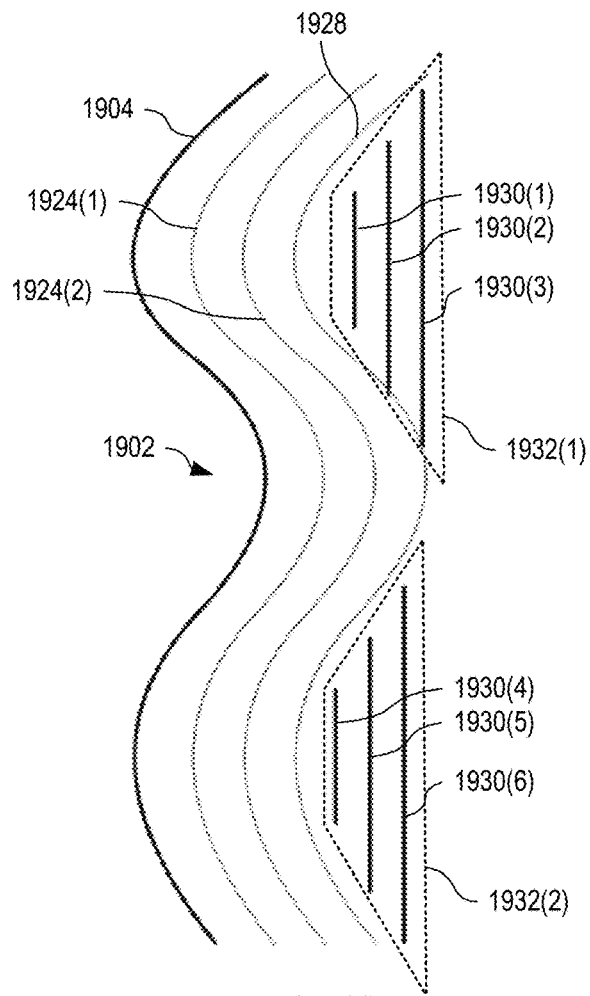
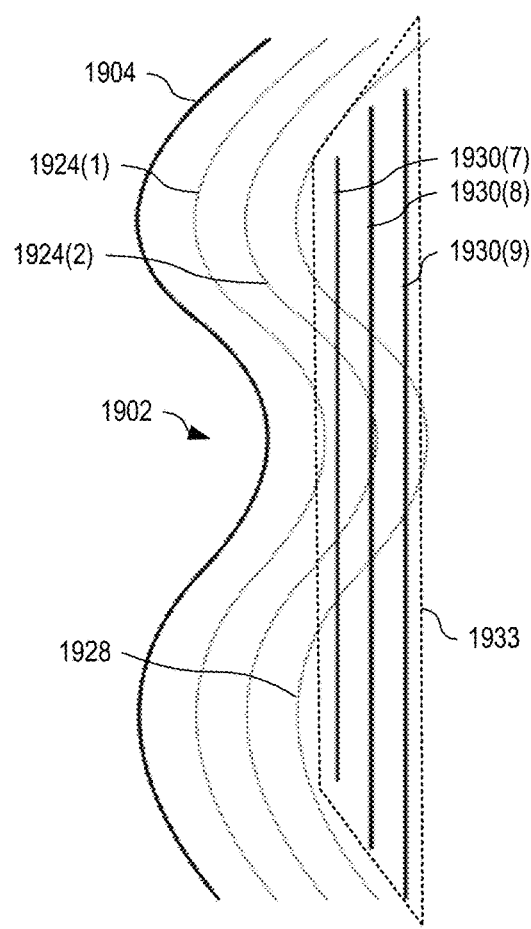
*FIG. 19A*  *FIG. 19B*
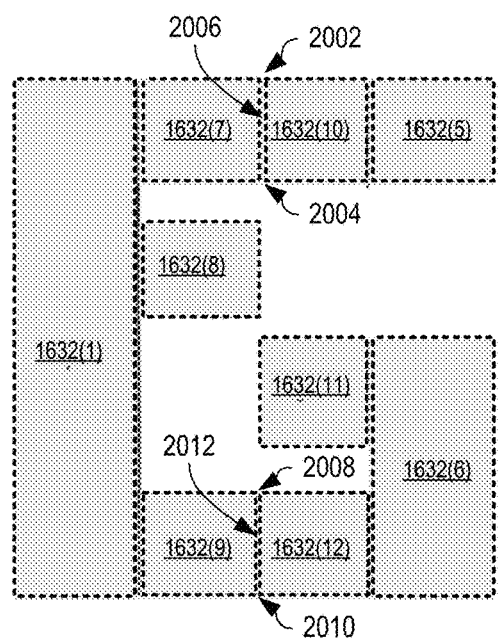
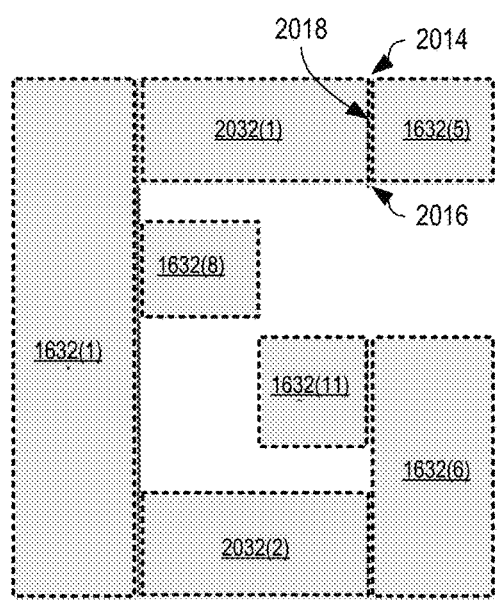
*FIG. 20A*  *FIG. 20B*

NONHOLONOMIC ROBOT FIELD COVERAGE METHOD

RELATED APPLICATION

This application claims priority to U.S. Patent Application Ser. No. 62/965,026, filed Jan. 23, 2020, and is incorporated herein in its entirety by reference.

BACKGROUND

The ability to have a robot traverse a field such that it performs a task over the entirety of the field is a generally well-studied problem. The problem is simplified through use of certain assumptions about the robot and by using simplified shapes for the field and any obstacles within that field.

SUMMARY

One aspect of the present embodiments includes the realization that a robot is not usually holonomic (e.g., a machine with zero-radius turning, a differential drive, etc.), particularly when configured to perform a specific task, and therefore the prior art assumptions and resulting field coverage is incomplete and incorrect. The present embodiments solve this problem by providing a method that determines a path that a nonholonomic robot (and holonomic robot) can follow to perform a task over the entirety of the field, while avoiding obstacles within the field.

Given a boundary of a field and descriptions of all obstacles—areas to be avoided—within the field, the disclosed nonholonomic robot field coverage method generates a path for a nonholonomic robot to follow that covers the field in such a way that (a) the robot follows a straight line (as defined by the generated path) for as long as possible while covering the field (thereby minimizing slower turns); (b) the robot avoids defined obstacles within the field; (c) a tool the robot uses to perform its task reaches (covers) every part of the field; (d) the robot is able to make turns defined by the generated path (e.g., obeying a minimum turning radius of the robot).

BRIEF DESCRIPTION OF THE FIGURES

FIGS. 19A and 19B show example operation of the cell processor of FIG. 3 merging two cells formed by a boundary shape, in embodiments.

FIGS. 20A and 20B show further example operation of the cell processor of FIG. 3 merging two cells that share two corners on a common side, in embodiments.

DETAILED DESCRIPTION OF THE EMBODIMENTS

Although examples described herein describe a robot sized specifically for cutting grass, the robot may be scaled and equipped for other situations and tasks, such as plowing, sowing, and so on.

Problem of Prior Art Assumptions

Prior art algorithms that use Boustrophedon Cellular Decomposition mislabel cells under certain conditions. However, no known prior art techniques are known for handling these mislabeled areas and the problem remained unsolved until the embodiments described herein. (See Island Resolution, below). Other prior art algorithms are based on holonomic robots and do not consider restrictions imposed by non-holonomic robots. For example, where the robot has a limited turning radius, prior art techniques are unable to link lanes such that all lanes of a cell are visited. Specifically, for the non-holonomic robot, adjacent lanes cannot be visited one after the other due to the limited turning radius of the robot. The prior art had no algorithms that linked lanes for non-holonomic robots until the present embodiments. (See Lane Linking below.) This lane linking problem further impacts how the robot transitions between adjacent cells, since the limited turning radius also prevents the robot from finishing on a last lane of a first cell that is adjacent a first lane of the next cell. This impacts how a cell graph may be connected to provide a valid path through the field and therefore invalidates certain transitions between cells that prior art algorithms make, and thereby increases complexity of paths through the field since there are a greater number of combinations of valid cell traversal and lane linking as compared to those considered by prior art algorithms for holonomic robots. This effectively increases the problem space for cell graph traversal by an exponential factor of between two and three. Prior art algorithms also failed to consider wrapping (warping) lanes that intersect an obstacle around that obstacle, and therefore the present embodiments implement this wrapping from first principles. The following embodiments solve all these omissions of the prior art by providing algorithms and techniques that provide lane linking, cell traversal, and lane wrapping, for non-holonomic robots.

Figure 1:
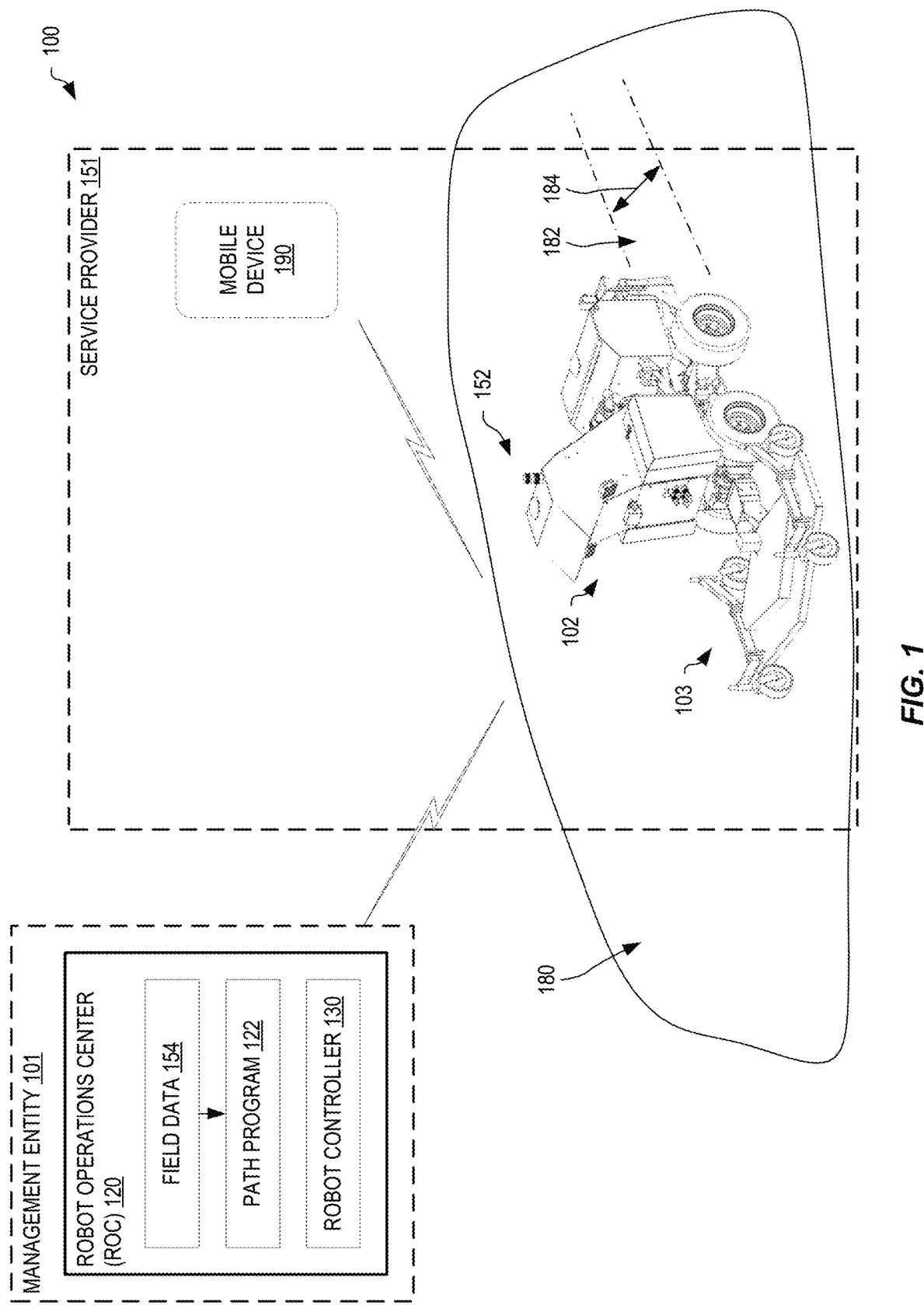
FIG. 1 shows one example nonholonomic robot field coverage system, in embodiments.

FIG. 1 shows one example nonholonomic robot field coverage system 100 that includes a nonholonomic robot 102. The nonholonomic robot 102 has a tool 103 that performs a task 182 (e.g., mowing) and includes at least one navigation sensor 152, such as one or more of: global positioning system (GPS) which may be enhanced by a Wide Area Augmentation System (WAAS), magnetometers, accelerometers and speedometers, and gyroscopes. Tool 103 performs task 182 with a task width 184 (e.g., a width of cut made by tool 103 and taking into account a desired overlap between lanes, such as 5 cm of overlap to account for any error in the navigation of robot 102 and/or the data used). For obstacle detection, nonholonomic robot 102 may employ sensors such as one or more of: RADAR, LIDAR, thermal imaging cameras, visual-wavelength color cameras, and ultrasonic sensors adapted to detect a texture as well as presence of obstacles.

In the example of FIG. 1, nonholonomic robot 102 is controlled from a robot operations center (ROC) 120 and/or a mobile device 190. ROC 120 may be a computer server type device that is accessible via the Internet, and mobile device 190 may be a smart phone. However, nonholonomic robot 102 may be controlled from other computer devices without departing from the scope hereof.

ROC 120 receives field data 154 defining a boundary, and any included obstacles (e.g., areas within the field that nonholonomic robot 102 is not to enter), of a field that is to be covered by nonholonomic robot 102. Field data 154 defines a list of geographical points and may be created by any method, including by using a physical tool to record points at the field, and by a software tool that allows a user to interactively define points on a map and/or areal image (e.g., an image obtained from a web mapping service such as Google Maps). A robot controller 130 of ROC 120 generates a path program 122, based at least in part upon field data 154, that includes a sequence of directives, such as movement directives with coordinates defining locations within field 180, and with control directives for controlling components and tools of nonholonomic robot 102. Nonholonomic robot 102 follows these directives to perform its task covering field 180. For example, path program 122 may also include operational directives that instruct nonholonomic robot 102 to control tool 103 as needed and may also include operational directives controlling operation of various additional features such as lights, and operation of an aural warning and/or communications system. In embodiments, ROC 120 and nonholonomic robot 102 communicate wirelessly using one or more of a cellular carrier, Wi-Fi, the Internet, Bluetooth, and so on.

In embodiments, field data 154 includes at least one of global positioning system (GPS) coordinates, orientation in the Earth's magnetic field, and maximum speeds. In addition, field data 154 may include one or more of RADAR, LIDAR, and ultrasonic ranges to nearby obstacles as well as textures of obstacles recorded with each coordinate around the boundary and/or obstacles in field 180.

In an alternative embodiment, nonholonomic robot 102 may be manually controlled to capture field data 154 of field 180.

Figure 2A:
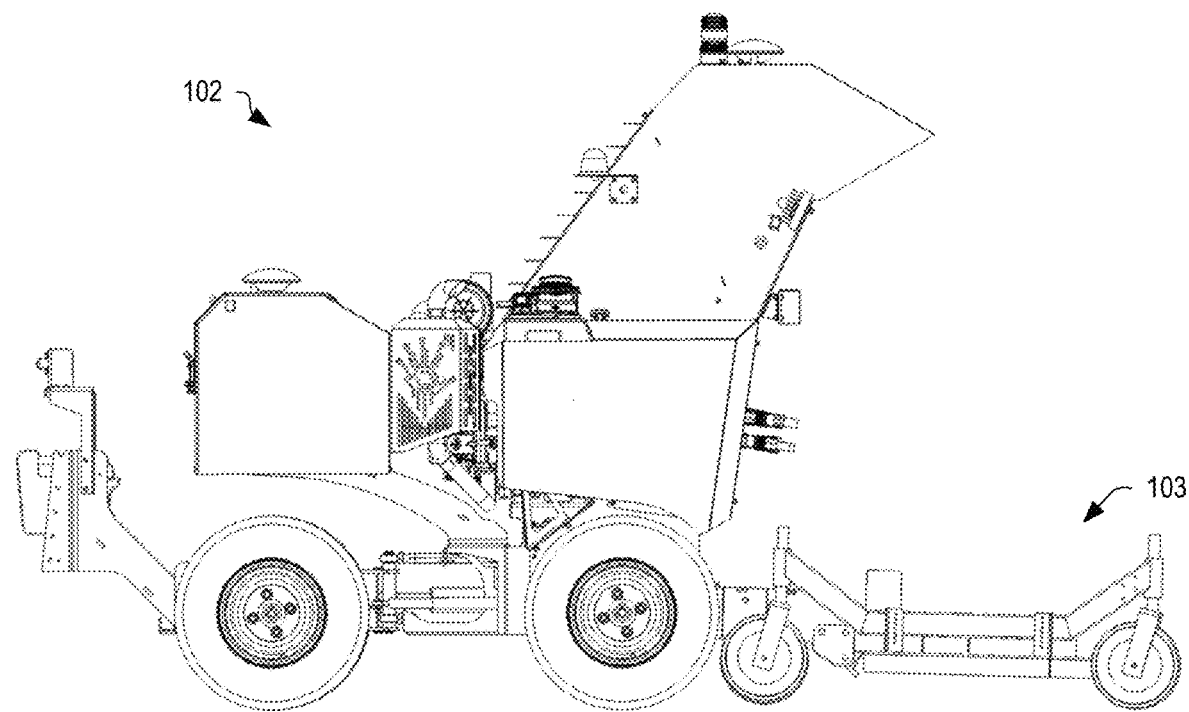
FIG. 2A is a side view of the robot of FIG. 1, in embodiments.
Figure 2B:
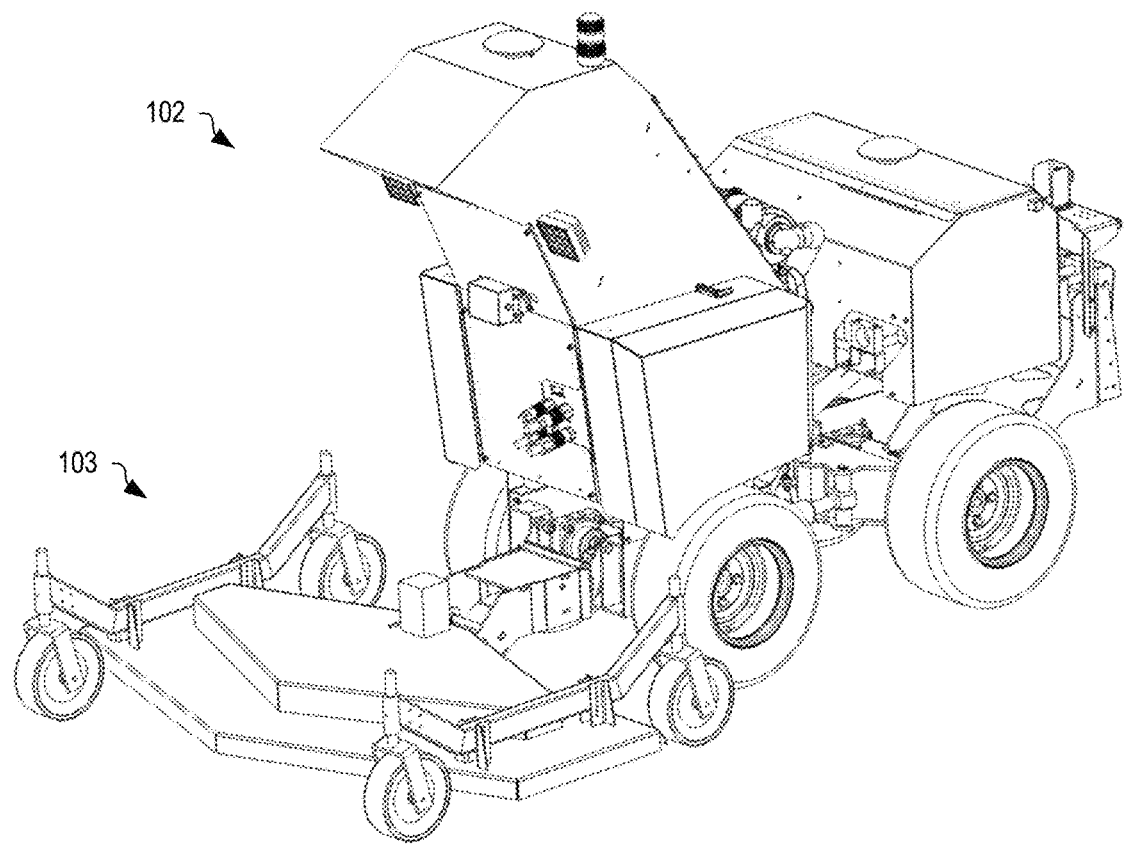
FIG. 2B is a perspective view of the robot of FIGS. 1 and 2.

FIG. 2A is a side view of nonholonomic robot 102. FIG. 2B is a perspective view of nonholonomic robot 102. In these examples, tool 103 is a removable multiple rotor mulching rotary mower deck. However, other tools may be attached to nonholonomic robot 102 to enable nonholonomic robot 102 to perform other tasks without departing from the scope hereof.

System 100 may be operated by one or more entities, and is illustratively shown in FIG. 1 with a management entity 101 operating ROC 120 and a service provider 151 that operates nonholonomic robot 102 to provide a service at field 180 for a third party. Accordingly, service provider 151 may purchase, lease, or rent nonholonomic robot 102 from management entity 101 (or from another entity) or be contracted by the third party to provide services at field 180. Service provider 151 then contracts with management entity 101 to control nonholonomic robot 102 to perform the service at each service location. Service provider 151 may be contracted by multiple parties to provide service at multiple service locations without departing from the scope hereof. In certain scenarios, a single entity may provide both management and service to the third party.

Nonholonomic robot 102 may represent any controllable robot, such as robot 102 disclosed in PCT/US2017/060882. Nonholonomic robot 102 may operate autonomously and includes a controller (e.g., an on-board computer) with a processor, memory, and an interface that provides communication between nonholonomic robot 102 and ROC 120 and/or mobile device 190 using one or more of Wi-Fi, Bluetooth, cellular, Ethernet, and USB type connections and connectors.

The Robot Operations Center (ROC)

Figure 3:
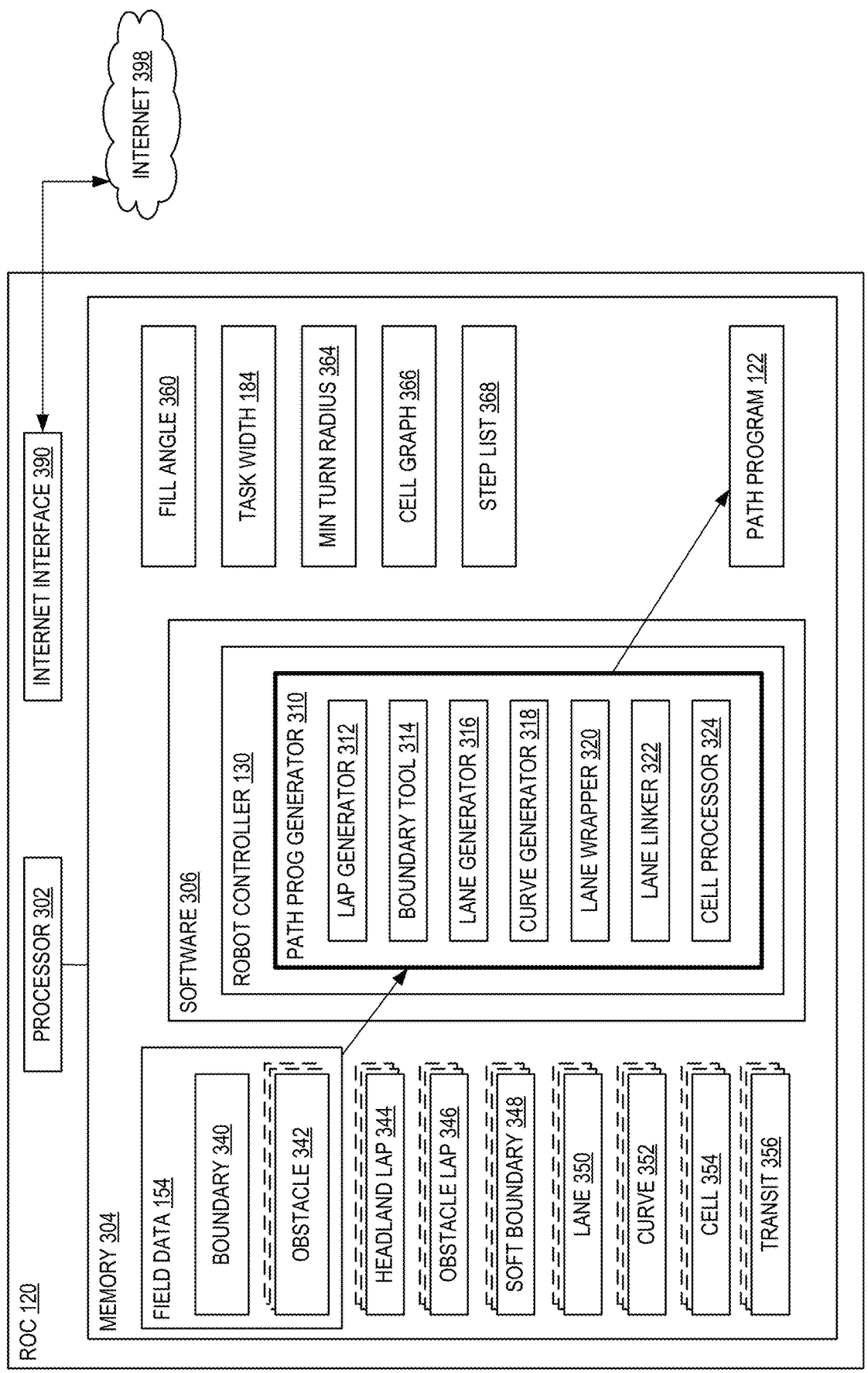
FIG. 3 is a block diagram illustrating the robot operation center of FIG. 1 in further example detail, in embodiments.

FIG. 3 is a block diagram showing ROC 120 of FIG. 1 in further example detail. ROC 120 is a computer (e.g., a server) that includes a digital processor 302 communicatively coupled with memory 304 and an Internet interface 390. Memory 304 represents one or both of volatile memory (e.g., RAM, DRAM, SRAM, and so on) and non-volatile or non-transitory memory such as FLASH, ROM, magnetic memory, magnetic disk, and other nonvolatile memory known in the computer art, and is illustratively shown storing software 306 implemented as machine readable instructions that are executed by processor 302 to provide the functionality of ROC 120 as described herein.

Software 306 includes robot controller 130 implemented with a path program generator 310 that generates path program 122 based, at least in part, upon field data 154. Robot controller 130 may include other functionality for controlling operation of nonholonomic robot 102, as disclosed in PCT/US2017/060882. For example, robot controller 130 may send path program 122 to nonholonomic robot 102 and interactively monitor and direct nonholonomic robot 102 to follow a plurality of directives stored within path program 122, which may include coordinates and orientation vectors and other operational instructions, such as acceleration, speed, and the direction of discharge, for robot 102 to follow to cover field 180. Robot controller 130 may implement a situation analyzer that processes status of robot 102, determines progress of robot 102 through path program 122, and resolves situations encountered by robot 102 that cannot be resolved by robot 102.

In certain embodiments, ROC 120 includes one or more servers (e.g., computers, each with memory and at least one processor) that communicate with one another and with robot 102 as it operates to execute path program 122. ROC 120 may simultaneously communicate with a plurality of robots 102, controlling each one independently to complete different tasks, and convey status of each robot 102 to one or more human operators. For example, an operator may connect to ROC 120 via a web browser over the Internet to monitor progress of the robots to complete their tasks. Each operator may be in charge of one or more robots 102. ROC 120 may thereby provide a cloud service (SaaS) that a customer uses to monitor operation of their robot(s) 102.

Field Boundaries

Path program generator 310 includes a boundary tool 314 that converts field data 154 into coordinates of a two-dimensional plane to facilitate processing. For example, where field data 154 includes geographical latitude and longitude data, this data may be converted into integer-based coordinates of a two-dimensional plane.

Figure 4:
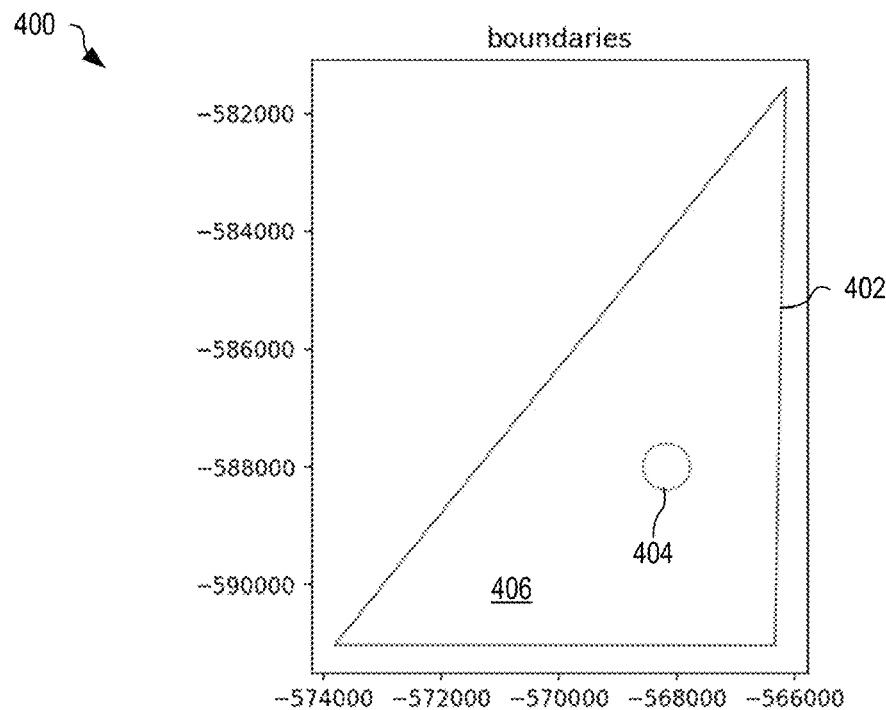
FIG. 4 is a graph illustrating an example external triangular boundary of the field of FIG. 1 that bounds a coverage area in which the nonholonomic robot is to perform its task, in embodiments.

FIG. 4 is a graph 400 illustrating an example external triangular boundary 402 of field 180 of FIG. 1 that bounds a coverage area 406 in which nonholonomic robot 102 is to perform its task. In this example, field data 154 also defines an obstacle 404 (e.g., an internal boundary) that is an area located within boundary 402 that nonholonomic robot 102 should avoid. Boundary 402 is an example of boundary 340, and obstacle 404 is an example of obstacle 342. In certain embodiments, boundary tool 314 may downsample point densities of boundary 402 and obstacle 404 by applying a decimation algorithm (e.g., Ramer-Douglas-Peucker) for example.

Figure 5:
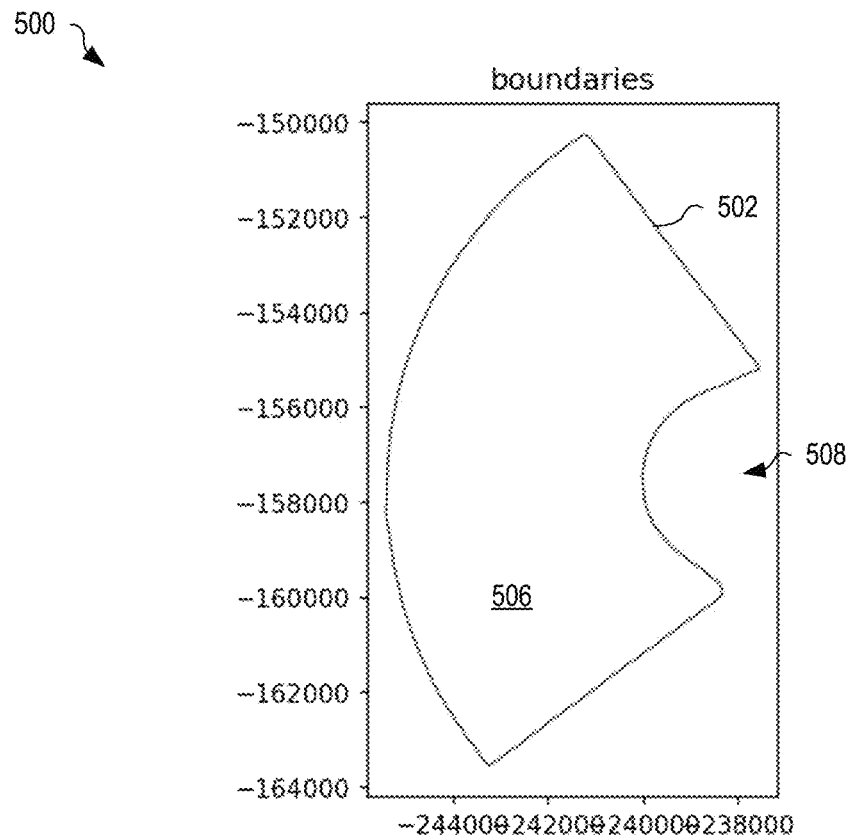
FIG. 5 is a graph illustrating another example boundary with a concavity—a portion of the boundary that is concave in shape, in embodiments.
Figure 6:
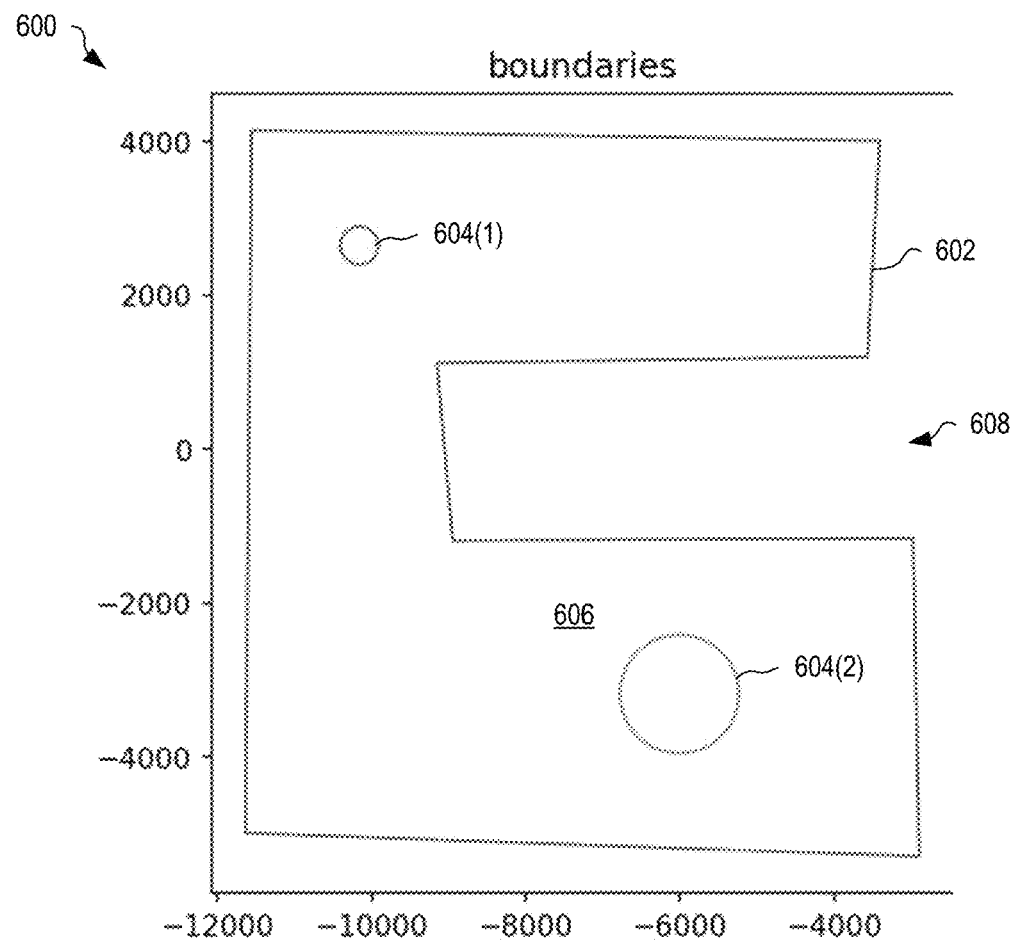
FIG. 6 is a graph illustrating another example boundary that includes two obstacles and a concavity, in embodiments.

FIG. 5 is a graph 500 illustrating another example boundary 502, defined by field data 154, that includes a coverage area 506 and forms a concavity 508—a portion of the boundary that is concave in shape. Boundary 402 of FIG. 4 does not have a concavity. FIG. 6 is a graph 600 illustrating another example boundary 602, defined by field data 154, that includes a coverage area 606, two obstacles 604(1) and 604(2), and a concavity 608.

Figure 7:
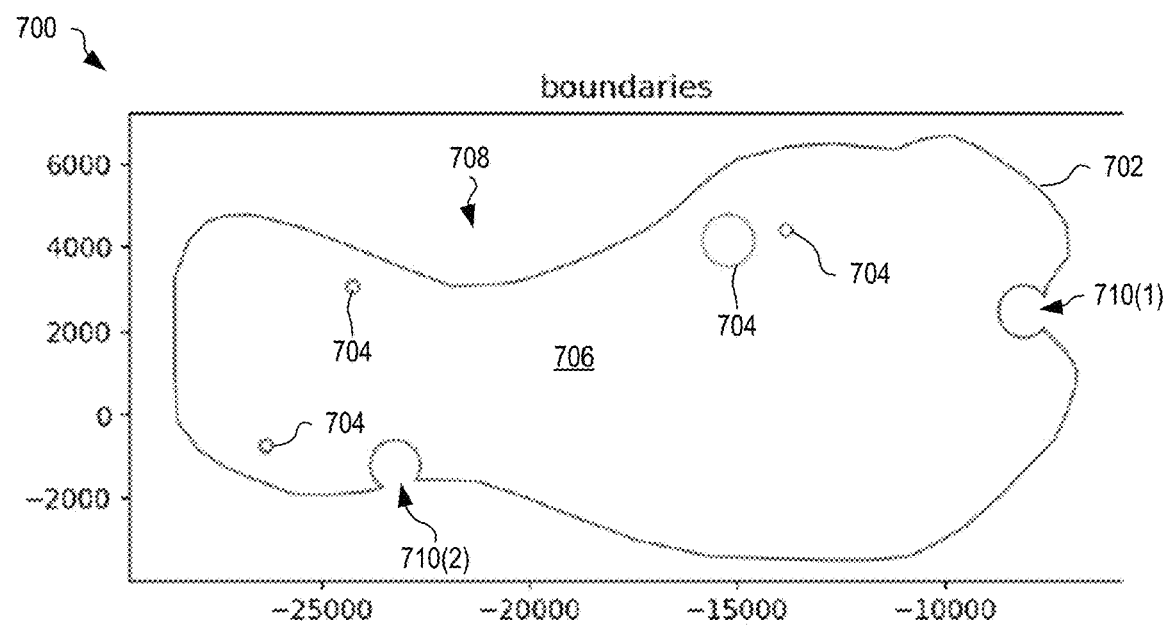
FIG. 7 is a graph illustrating another example boundary that includes a plurality of obstacles, a concavity, and two boundary absorbed obstacles, in embodiments.

FIG. 7 is a graph 700 illustrating another example boundary 702, defined by field data 154, that includes a coverage area 706, a plurality of obstacles 704, a concavity 708, and two boundary absorbed obstacles 710(1) and 710(2). Boundary tool 314 adjusts boundary 702 to exclude an obstacle when nonholonomic robot 102 cannot pass between one of obstacles 704 and boundary 702. Concavities, obstacles, and boundary absorbed obstacles, add complexity to generation of path program 122 that prior art algorithms simplify and/or ignore. The following disclosure introduces algorithms and techniques that overcome the problems of the prior art to provide robust generation of path program 122 for any shape of field 180, with and without obstacles and without regard to the shapes of any obstacles that may be present.

Features and Definitions

Figure 8:
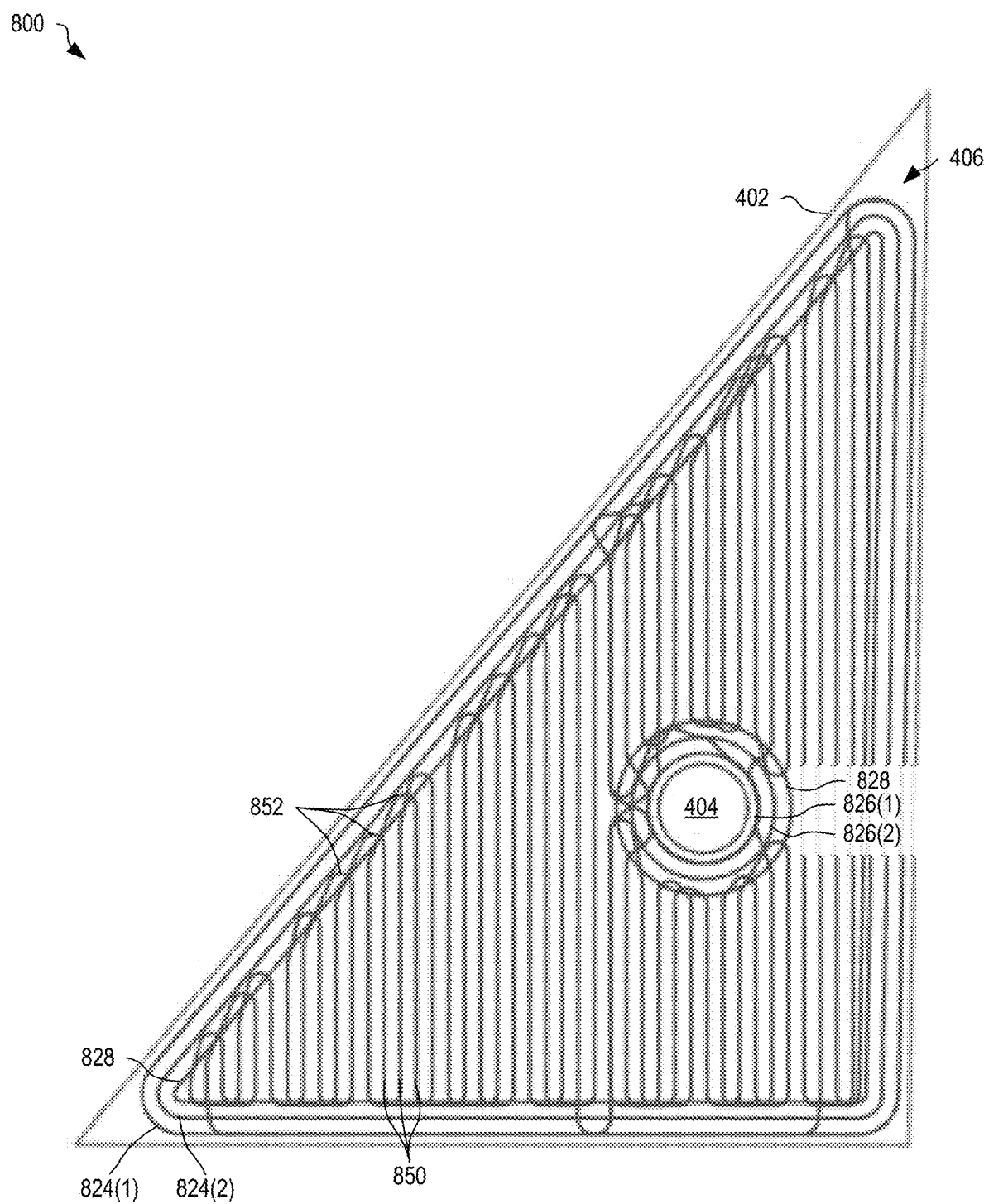
FIG. 8 is a graph showing headland laps, obstacle laps, soft boundaries, and lanes that are used to generate the path program for the coverage area of FIG. 4, in embodiments.

To introduce other features and definitions used herein, FIG. 8 is a graph 800 showing headland laps 824, obstacle laps 826, soft boundaries 828, and lanes 850 (shown as lanes 350 in FIG. 3) that are used to generate path program 122 for coverage area 406 of FIG. 4. Lanes 850 are parallel straight lines spaced apart, based upon task width 184 of tool 103 (e.g., mower cutting width), to traverse coverage area 406 at a selected fill angle 360 (FIG. 3). Accordingly, as shown in FIG. 8, coverage area 406 is covered by a plurality of parallel lanes 850. In certain embodiments, fill angle 360 is determined automatically based upon a shape and orientation of boundary 402. In other embodiments, fill angle 360 is selected by a user of nonholonomic robot 102. For example, fill angle 360 may be selected prior to initiation of nonholonomic robot 102 such that a direction of lanes 850 may be varied between different runs of nonholonomic robot 102.

In one embodiment, a lane generator 316 of path program generator 310 forms lanes parallel to an X axis of the two-dimensional plane. Boundary tool 314 rotates, within the two-dimensional plane, boundary 402 and obstacle 404 based upon fill angle 360, such that lanes 850 are generated at the desired fill angle 360 relative to boundary 402 of field 180.

Path program generator 130 includes a curve generator 318 that generates curves 852 (shown as curves 352 in FIG. 3) using a technique described below—similar to Dubins curves (also known as Dubins path), with a radius no less than a minimum turning radius of nonholonomic robot 102 to connect lanes 850, and thereby provide a path for nonholonomic robot 102 to follow between the straight lines of lanes 850.

Headland laps 824 (shown as headland laps 324 in FIG. 3) define a path that generally matches the shape of boundary 402. For example, an inner headland lap 824(1) is formed inside boundary 402 and is closer to boundary 402 that an outer headland lap 824(2). Similarly, obstacle laps 826 (shown as obstacle lap 324 in FIG. 3) define a path that generally matches the shape of obstacle 404, where an inner obstacle lap 826(1) is closer to obstacle 404 that an outer obstacle lap 826(2). Laps 824 and 826 are generated to control nonholonomic robot 102 to perform its task to hide the turns made by nonholonomic robot 102 when transitioning between lanes 850. For example, where the task is mowing, these laps provide a definite edge to a mowed area and ensure that any area that may have been missed in the course of a turn is covered.

A soft boundary 828 (shown as soft boundary 328 in FIG. 3) is generated similarly to headland laps 824 and obstacle laps 826, and generally matches the shape of boundary 402 or obstacle 404 and is sized to fit within outer headland lap 824(2) or outside outer obstacle lap 826(2). Curves may also be added to soft boundaries 828, but soft boundary 828 is not followed by nonholonomic robot 102.

Nonholonomic robot 102 is controlled by path program 122 to follow lanes 850, curves 852, headland laps 824, and obstacle laps 826 to cover (performing its task 182) field 180.

Generating Laps

In certain embodiments, path program generator 310 includes a lap generator 312 that includes one or more algorithms for generating an inner headland lap substantially half of task width 184 inside of the field boundary, such that the inner headland lap and the boundary are separated by half of task width 184. As noted above, task width 184, defined within ROC 120, is based upon an operational width (e.g., mower cut width) of tool 103 of nonholonomic robot 102. For example, task width 184 may define the width of the task being performed by nonholonomic robot 102 with each pass.

In the example of FIG. 8, lap generator 312 processes boundary 402 to generate one or more headland laps 824, and processes obstacle 404 to generate one or more obstacle laps 826. Lap generator 312 also generates at least one soft boundary 828 based upon boundary 402 and at least one soft boundary 828 based upon obstacle 404.

Figure 9:
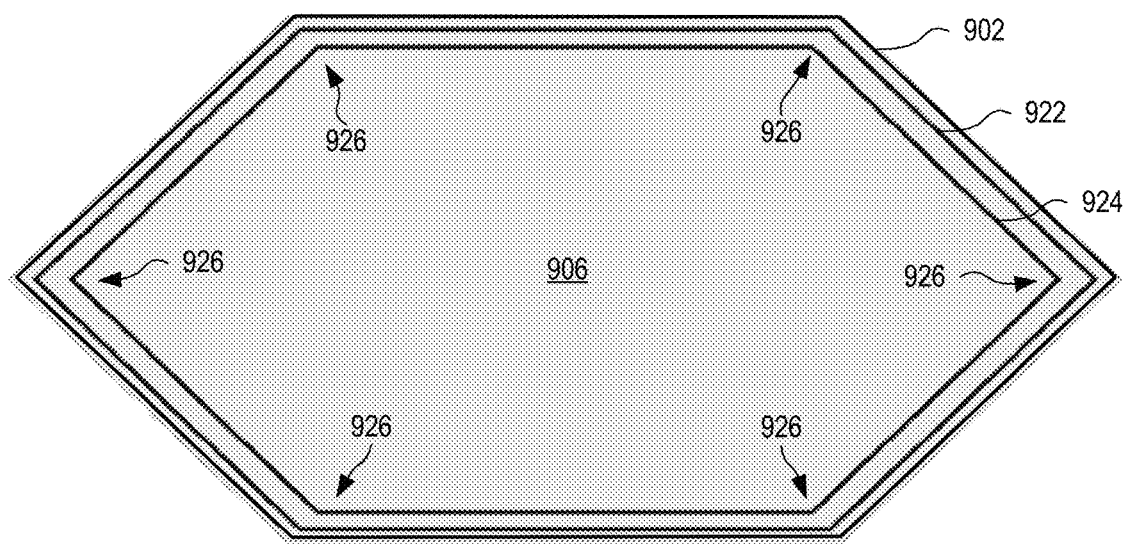
FIG. 9 shows an example hexagonally shaped boundary with three generated internal shapes, in embodiments.

FIG. 9 shows example first stages of lap generation where lap generator 312 processes a hexagonally shaped boundary 902 to generate two generated internal shapes 922 and 924. Boundary 902 is an example of boundary 340 of FIG. 3. First shape 922 is generated parallel to, and inside, boundary 902 at an offset of half of task width 184, for example. A second shape 924 is generated parallel to, and inside, first shape 922 at an offset of task width 184. Where a minimum turning radius 364 of nonholonomic robot 102 is greater than zero, nonholonomic robot 102 may be unable to turn to follow the line defined by either first or second shapes 922 and 924 (e.g., where two straight lines meet), and therefore nonholonomic robot 102 may not be able to negotiate corners 926.

In some circumstances, laps are generated for nonholonomic robot 102 to follow, and in other circumstances, laps are used only for determining coverage.

Figure 10:
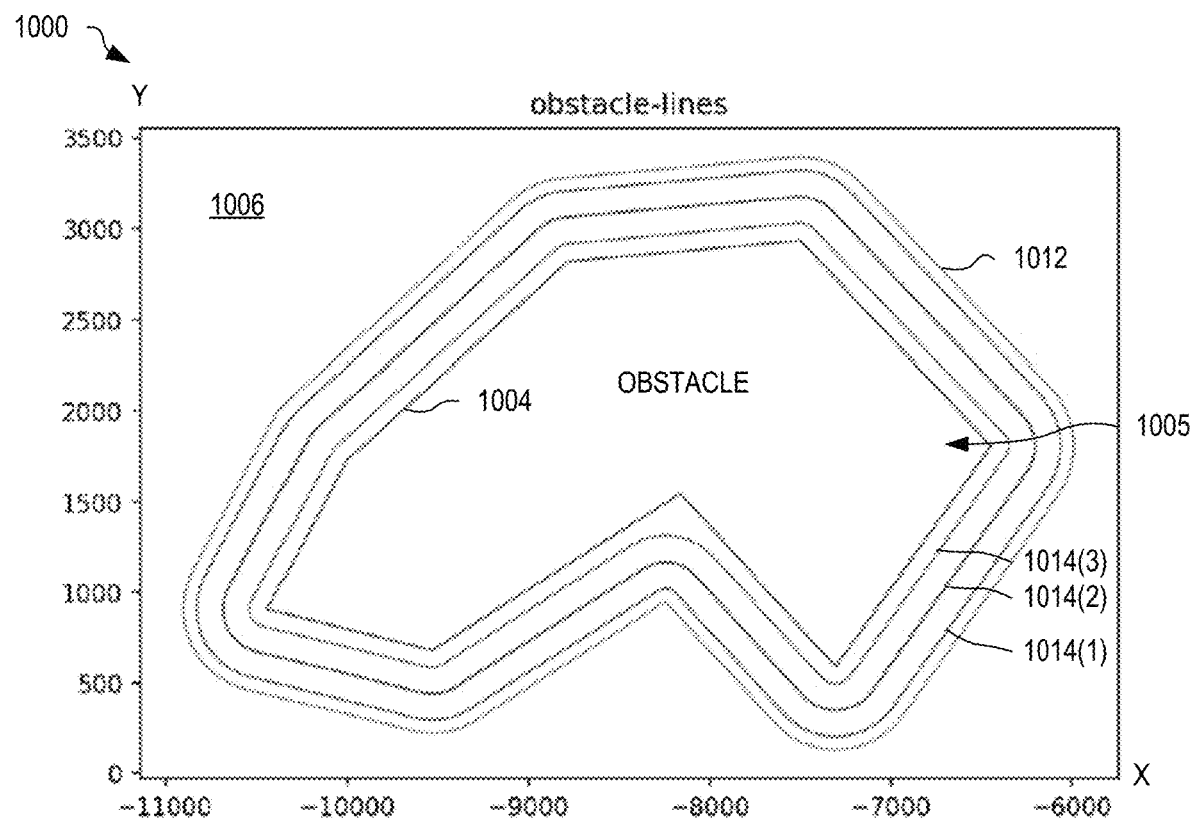
FIG. 10 is a graph illustrating obstacle laps and a soft boundary generated for an example obstacle, in embodiments.

FIG. 10 is a graph 1000 illustrating obstacle laps 1014 and a soft boundary 1012 generated for an example obstacle 1004 within a coverage area 1006 (outer boundary not shown) of field 180. Soft boundary 1012 is an example of soft boundary 348. Obstacle 1004 is a line that defines a hard boundary of an area 1005 to be avoided by nonholonomic robot 102; nonholonomic robot 102 is not driven along this line. In the example of FIG. 10, obstacle 1004 has a horizontal width (along x axis) that is greater than two task widths 184, and therefore three concentric obstacle laps 1014(1)-(3) and a soft boundary 1012 are formed around obstacle 1004 such that nonholonomic robot 102 may avoid obstacle 1004 and follow laps 1014(1)-(3) to hide the turns made by nonholonomic robot 102 when linking lanes together. Soft boundary 1012, generated around obstacle 1004 and obstacle laps 1014, is used to determine ends of lanes (see lanes 350, FIG. 8) such that nonholonomic robot 102 avoids obstacle 1004. However, nonholonomic robot 102 is not driven along soft boundary 1012.

In one example of operation, lap generator 312 parallel offsets the hard boundary of obstacle 1004 outwards to generate soft boundary 1012 (e.g., at two-and-a-half times task width 184 from obstacle 1004). During this process, the hard edges of obstacle 1004 are naturally rounded to form the shape of soft boundary 1012. Lap generator 312 then parallel offsets soft boundary 1012 inwards three times, with varying distances, to form outer lap 1014(1), middle lap 1014(2), and inner lap 1014(3).

Figure 11:
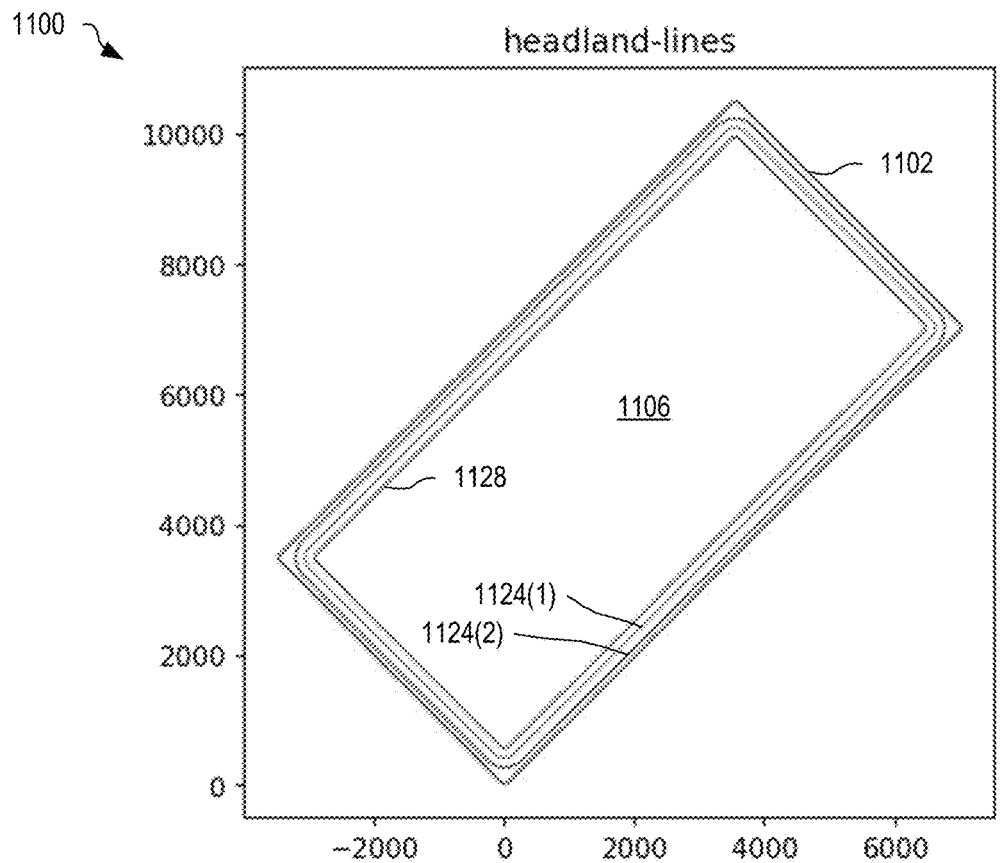
FIG. 11 is a graph illustrating headland laps generated for an example boundary, in embodiments.

FIG. 11 is a graph 1100 illustrating headland laps 1124 generated for an example boundary 1102 defining a coverage area 1106 of field 180. Boundary 1102 is a line that defines a hard boundary to be avoided by nonholonomic robot 102; nonholonomic robot 102 is not driven along the line of boundary 1102. In the example of FIG. 11, as described above for FIG. 9, a soft boundary 1128 and two concentric headland laps 1124(1)-(2) are generated within boundary 1102. Soft boundary 1128 is used to determine ends of lanes (e.g., see lanes 850, FIG. 8 and lane generation below) such that nonholonomic robot 102 does not cross boundary 1128. Nonholonomic robot 102 does not follow the line of soft boundary 1128, but does follow the lines of headland laps 1124(1)-(2) to hide the turns made by nonholonomic robot 102 when linking lanes together.

In one example of operation, lap generator 312 parallel offsets hard boundary 1102 inwards to generate soft boundary 1128 (e.g., at three-and-a-half times task width 184 from boundary 1102). Lap generator 312 then parallel offsets soft boundary 1128 outwards two times, with varying distances (e.g., one task width 384 from the previous), to form inner headland lap 1124(1), and outer headland lap 1124(2). During this process, the hard edges of soft boundary 1128 are naturally rounded to form the shape of headland laps 1124.

Corner Rounding

Figures 12A, 12B, 12C:
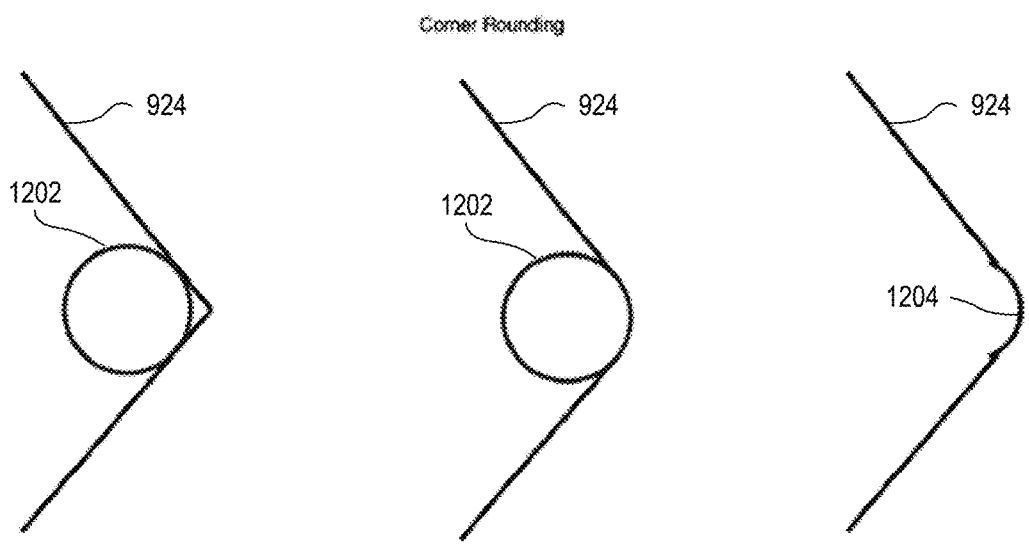
FIGS. 12A through 12C show example steps of corner rounding, in embodiments.

FIGS. 12A, 12B, and 12C show a second stage of generating paths that may be followed by non-holonomic robot 102 by rounding corners. Lap generator 312 primarily relies upon rounding that occurs as a side-effect of generating laps. Explicit rounding of corners, as shown in FIGS. 12A-12C may be used as an alternate method for generating laps for certain applications, as where the recorded boundaries contain many features that the robot cannot follow due to turning radius constraints, but a coverage that tracks the recorded boundaries as closely as possible is desired. Thus, although the examples of FIG. 12A-12C use corners 926 of first shape 922 and second shape 924, such rounding may occur when laps are generated.

In embodiments, lap generator 312 uses an algorithm based upon Dubins curves to round corners 926 of shapes 922 and 924 to form headland laps 344. As shown in FIG. 12A, a circle 1202 of radius minimum turning radius 364 (or any desired turning radius—see adjustment of turning radius described below) is positioned at corner 926 to tangentially touch both straight lines forming the corner. As shown in FIG. 12B, portions of each straight line between the corresponding tangent and the corner are removed (e.g., each straight line is retracted from the corner to the corresponding tangent), and, as shown in FIG. 12C, an arc 1204 of the circle between the two tangents joins the remaining straight lines. Accordingly, nonholonomic robot 102 may follow arc 1204 to transition from the path of one line to the other.

Lane Generation and Cells

Figure 13:
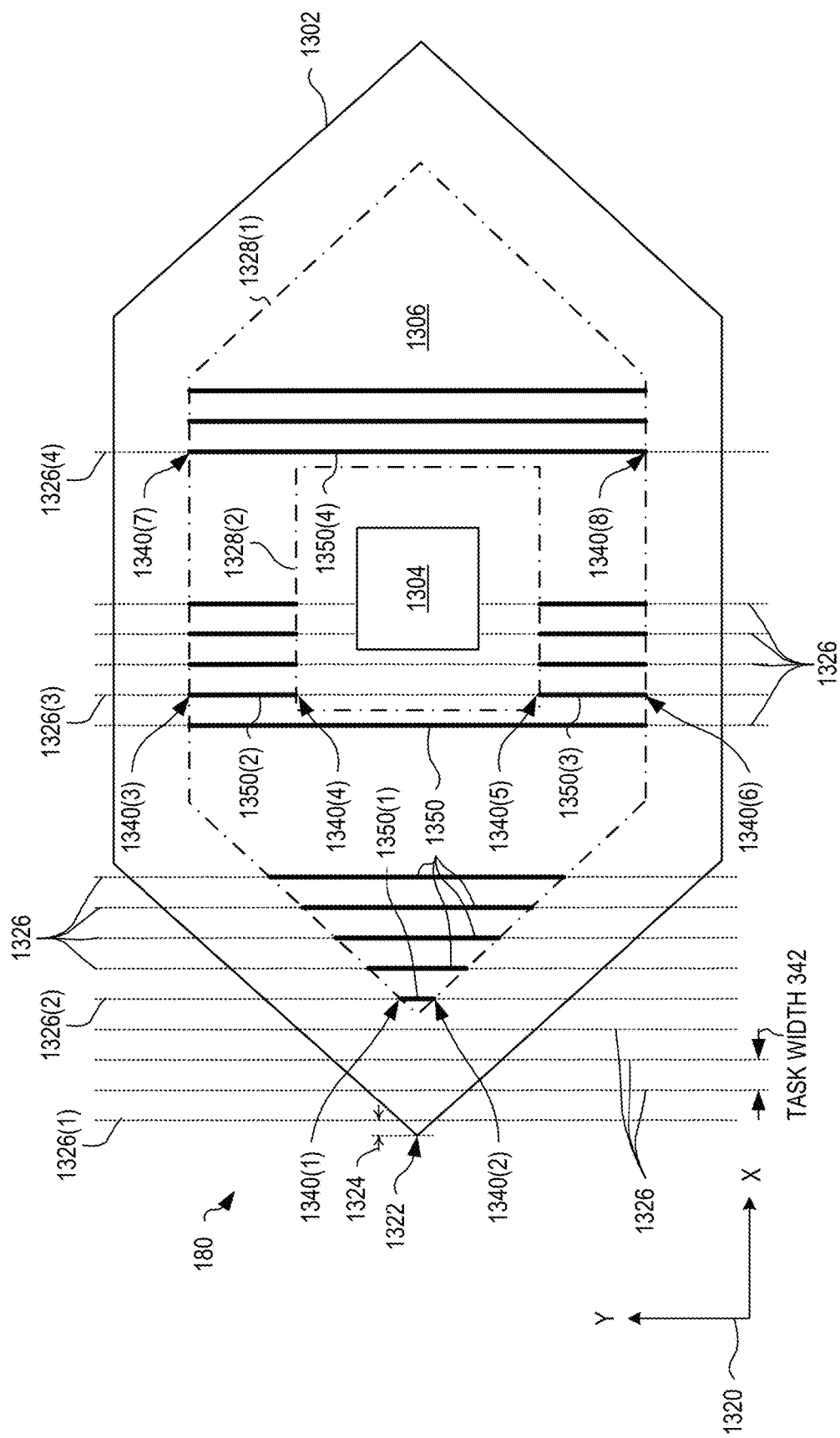
FIG. 13 is a graph representing the field of FIG. 1 and illustrating operation of the lane generator of FIG. 3 when generating lanes, in embodiments.

FIG. 13 is a graph 1300 representing field 180 and illustrating operation of lane generator 316 when generating lanes 1350. Lanes 1350 are examples of lanes 350 of FIG. 3. Graph 1300 shows field 180 with a boundary 1302 and an obstacle 1304. As described above, a first soft boundary 1328(1) is generated for boundary 1302, and a second soft boundary 1328(2) is generated for obstacle 1304.

Lane generator 316 may implement an algorithm based upon Boustrophedon Cellular Decomposition to generate lanes to cover the operational area of field 180. Within graph 1300, lane generator 316 moves a vertical (i.e., parallel to y axis) scan line 1324 incrementally across graph 1300, from left to right (i.e., increasing x), with a spacing corresponding to task width 184. In one embodiment, lane generator 316 generates a first scan line 1326(1) a distance 1324 corresponding to half of task width 184 to the right of a left-most point 1322 (minimum x) of boundary 1302. For each incremental position of scan line 1326, lane generator 316 determines intersections 1340 where scan line 1326 intersects any soft boundary 1328. For example, lane generator 316 determines scan line 1326(2) intersects soft boundary 1328(1) at intersections 1340(1) and 1340(2). Lane generator 316 generates one lane 1350 between each pair of adjacent intersections 1340. For example, lane generator 316 generates lane 1350(1) along scan line 1326(2) between intersections 1340(1) and 1340(2). In another example, lane generator 316 determines scan line 1326(3) intersects soft boundary 1328(1) at intersections 1340(3) and 1340(6), and intersects soft boundary 1328(2) at intersections 1340(4) and 1340(5); lane generator 316 then generates lane 1350(2) along scan line 1326(3) between intersections 1340(3) and 1340(4) and generates lane 1350(3) along scan line 1326(3) between intersections 1340(5) and 1340(6). For clarity of illustration, not all scan lines and lanes are shown.

In the example of FIG. 13, obstacle 1304 has a width along x axis—perpendicular to scan lines 1326—that is greater than two task widths 184, and thus obstacle 1304 is avoided by nonholonomic robot 102. However, obstacles having a width that is less than two task widths 184 are ignored by lane generator 316 for purposes of detecting intersections. For these narrower obstacles, lanes 1350 are wrapped (see FIGS. 17A-17F) around the obstacle such that nonholonomic robot 102 avoids the obstacle.

Figure 14:
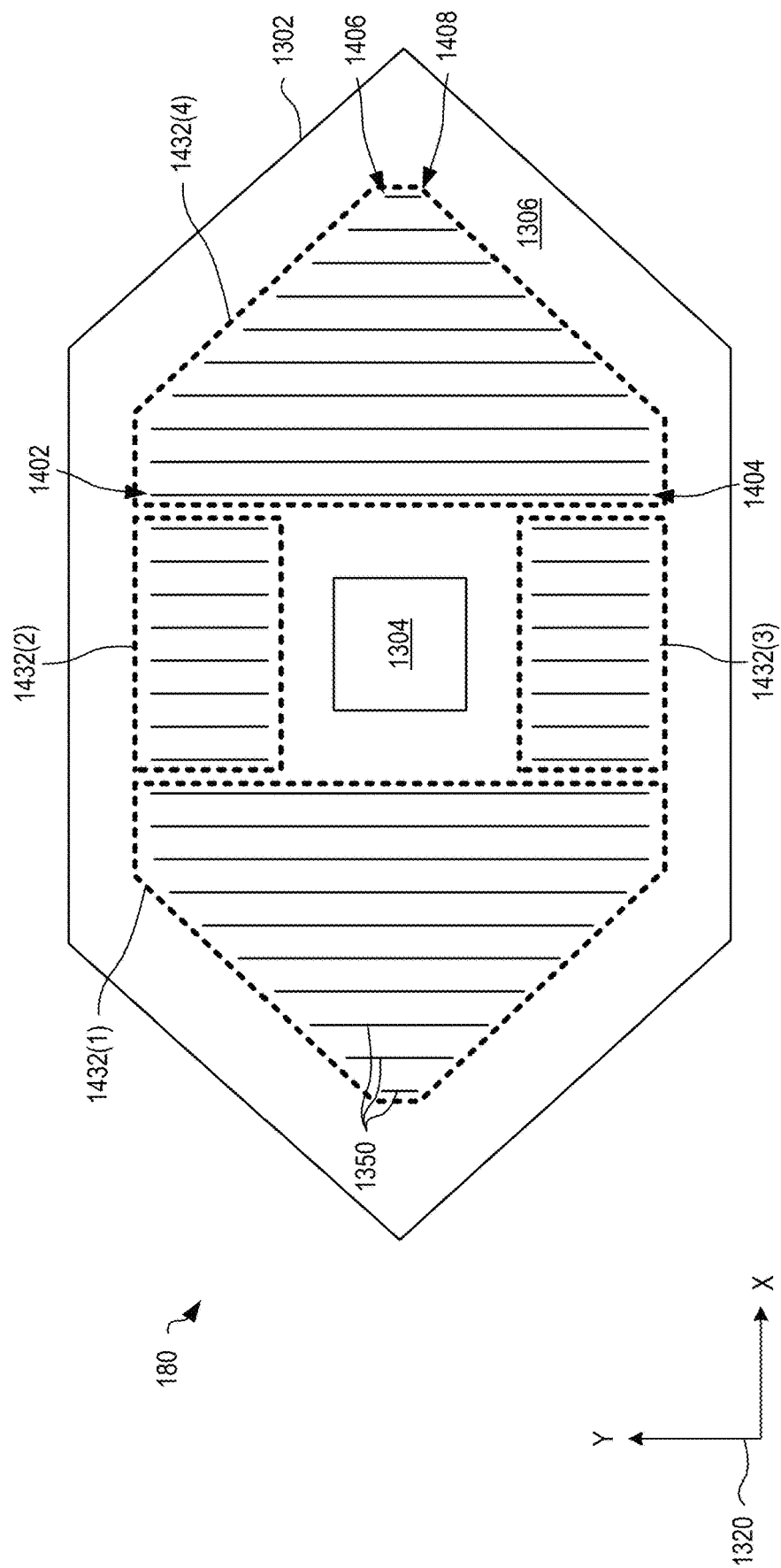
FIG. 14 is a graph that follows the example graph of FIG. 13 and further shows how cells are determined by the lane generator, in embodiments.

FIG. 14 is a graph that follows the example graph of FIG. 13 and further shows how cells 1432 are determined by lane generator 316. Cells 1432 are examples of cells 354 of FIG. 3. A cell 1432 is a group of lanes 1350 that may be processed by nonholonomic robot 102 in one pass. Any field 180 has at least one cell, but may have more, depending on the shape of the boundary and the size and number of obstacles therein. Cells represent a decision that needs to be made when covering a full field. A cell is a part of the field that would take the robot away from another part of the field. Each cell has four vertices: top left, top right, bottom left, and bottom right, which are made up of the top and bottom of the cell's first and last lane. These make up the four possible ways to enter a cell.

FIGS. 13 and 14 are best viewed together with the following description. As described above, to generate each lane 1350, lane generator 316 determines intersections 1340 between scan line 1326 and soft boundaries 1328. Where a number of intersections 1340 of adjacent scan lines 1326 changes, a new cell is formed (opened). For example, lane generator 316 opens a first cell 1432(1) at scan line 1326(2), which has two intersections 1340(1) and 1340(2), whereas prior scan lines had no intersections. At scan line 1326(3), lane generator 316 opens cells 1432(2) and 1432(3), closing cell 1432(1), since scan line 1326(3) has four intersections 1340(3)-(6), each generated lane 350(2) and 350(3) opens a new cell 1432(2) and 1432(3), respectively. At scan line 1326(4), lane generator 316 opens cell 1432(4), closing cells 1432(2) and 1432(3), since scan line 1326(4) has two intersections 1340(7) and 1340(8), and generated lane 350(4) opens a new cell 1432(4), respectively. Accordingly, each cell 1432 identifies a group of lanes 350 that may be processed together by nonholonomic robot 102.

Island Resolution

Figure 15A:
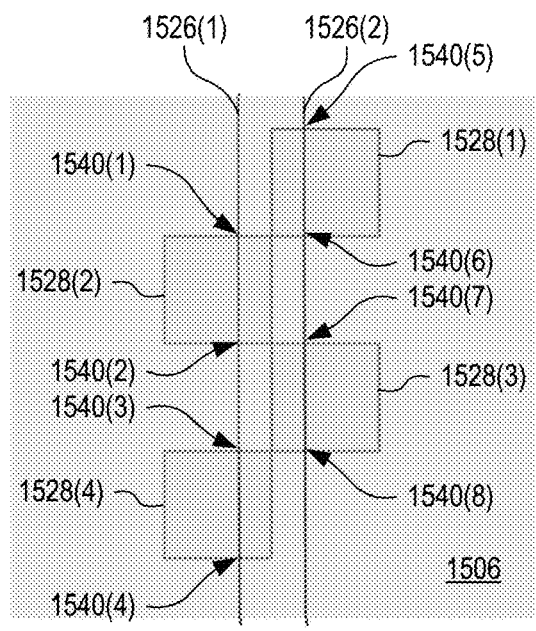
FIGS. 15A and 15B show how different soft boundaries may form an island, in embodiments.
Figure 15B:
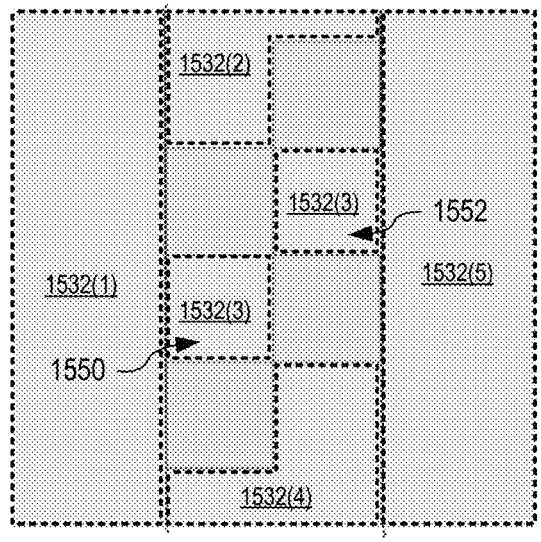
Figure 16A:
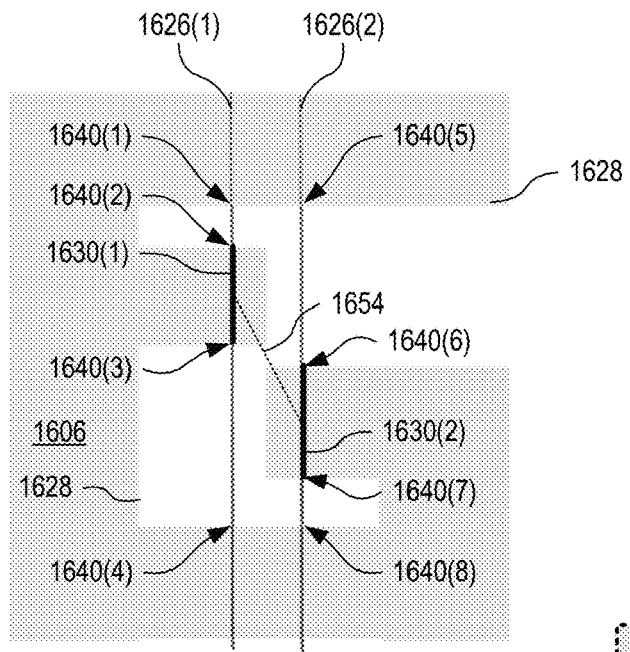
FIGS. 16A and 16B show how a common boundary may form an island, in embodiments.
Figure 16B:
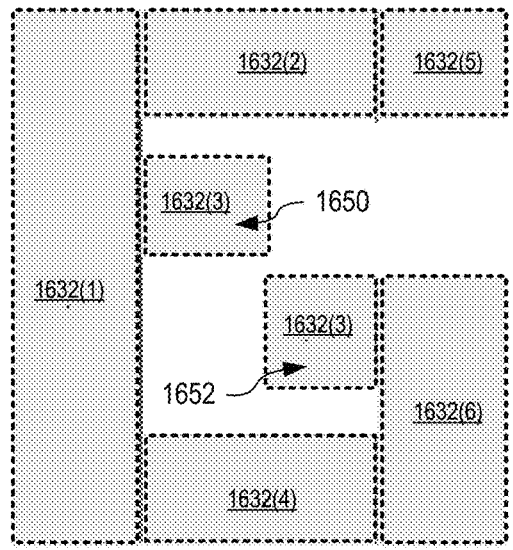

A new cell is not formed when the number of intersections determined for a current scan line equals the number of intersections for the previous scan line. However, for certain boundary shapes and scan line position combinations, the cardinality check of intersection count change may not cause the formation of new cells. Where lanes of a cell are not internally contiguous, this is termed an island, and cannot be processed. FIGS. 15A and 15B show how different soft boundaries 1528(1)-(4) may result in an island formed by areas 1550 and 552. FIGS. 16A and 16B show how a common boundary 1628 may form an island formed by areas 1650 and 1652. Accordingly, additional tests are performed to detect an island and force a cell division.

In the example of FIG. 15A, a coverage area 1506 (no outer boundary is shown) includes four internal soft boundaries 1528(1)-(4), each formed around an obstacle (not shown) for example. A scan line 1526(1) intersects the outer boundary twice, and each soft boundary 1528(2) and 1528(4) twice, at intersections 1540(1) and 1540(2), and 1540(3) and 1540(4), respectively. A subsequent scan line 1526(2) intersects the outer boundary twice, and each soft boundary 1528(2) and 1528(3) twice, at intersections 1540(5) and 1540(6), and 1540(7) and 1540(8), respectively. Accordingly, each scan line has six intersections and no new cell is formed for scan line 1526(2) using the cardinality check described above. As shown in FIG. 15B, this results in five identified cells 1532(1)-(5); however, cell 1532(3) is formed of two different areas 1550 and 1552 that are not contiguous, and thus areas 1550 and 1552 form an island. Cells 1532 are examples of cells 354 of FIG. 3.

Figure 15C:
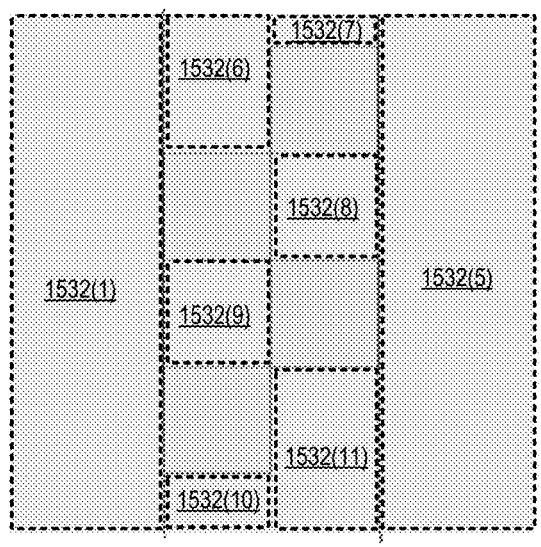
FIG. 15C shows changes that avoid the islands of FIGS. 15A and 15B, in embodiments.

To avoid islands resulting from different boundaries, lane generator 316 tracks both a number of intersections 1540 between scan line 1526 and soft boundaries 1528, and occurrence of which boundary is intercepted. When the number of intersections for the current scan line is the same as the number of intersections for the previous scan line, but when one (or more) of the intersected boundaries change, a new cell is formed. FIG. 15C shows the resulting changes in identified cells for operational area 1506, where cells 1532(1) and 1532(5) are similarly identified, but cells 1532(6) and 1532(7) replace cell 1532(2), cells 1532(8) and 1532(9) replace cell 1532(3), and cells 1532(10) and 1532(11) replace cell 1532(4). Advantageously, cell 1532(3), and areas 1550 and 1552, that formed the island is further divided to form independent cells 1532(8) and 1532(9), and therefore the island is avoided.

In the example of FIG. 16A, a coverage area 1606 has an outer boundary (not shown) and one internal soft boundary 1628, formed around an obstacle (not shown) for example. Alternatively, soft boundary 1628 could be part of the outer boundary. A scan line 1626(1) intersects the outer boundary twice, and soft boundary 1628 four times at intersections 1640(1)-(4). A subsequent scan line 1626(2) intersects the outer boundary twice, and soft boundary 1628 four times at intersections 1640(5)-(8). Accordingly, each scan line has six intersections and, using the cardinality check described above, no new cell is formed for scan line 1526(2). As shown in FIG. 16B, this results in six identified cells 1632(1)-(6); however, cell 1632(3) is formed of two different areas 1650 and 1652 that are not contiguous and therefore cell 1632(3) and areas 1650 and 1652 form an island. Cells 1632 are examples of cells 354 of FIG. 3. The island detection described for FIGS. 15A-C fails to prevent the island in areas 1650 and 1652, since both the number of intersections is the same and the intersected boundaries are the same between scan lines 1626(1) and 1626(2) in FIG. 16A.

Figure 16C:
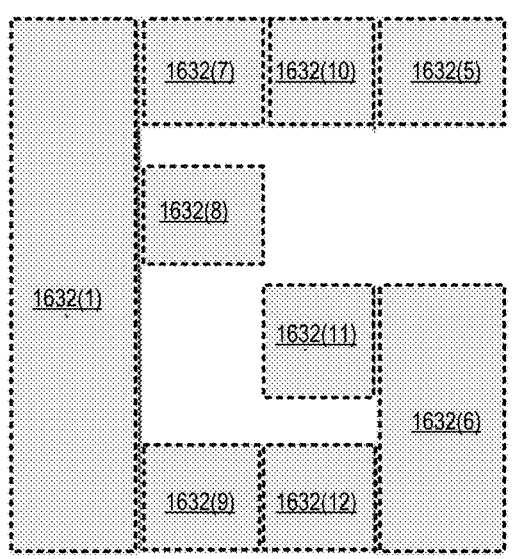
FIG. 16C shows changes that avoid the islands of FIGS. 16A and 16B, in embodiments.

To avoid islands resulting from the same boundary, lane generator 316 performs further analysis to determine whether, for a particular cell, a test line between (a) a mid-point of a lane formed by the previous scan line and (b) a mid-point of a lane formed by the current scan line passes through a soft boundary. Where the test line passes through a boundary, a new cell is opened (closing previous cells). As shown in FIG. 16A, test line 1654, formed between midpoints of lanes 1630(1) and 1630(2) intersect with soft boundary 1628, and therefore lane generator 316 opens a new cell with scan line 1626(2). FIG. 16C shows the resulting changes in formed cells for operational area 1606, where cells 1632(1), 1632(5), and 1632(6) are similarly formed, but cells 1636(7) and 1636(10) replace cell 1632(2), cells 1632(8) and 1632(11) replace cell 1632(3), and cells 1632(9) and 1632(12) replace cell 1632(4). Advantageously, the island formed at areas 1650 and 1652 is avoided.

Lane Wrapping

As noted above, when generating lanes, lane generator 316 may ignore obstacles that are fewer than two task widths wide. FIGS. 17A-17F shows example steps for wrapping lanes around a small obstacle.

Figure 17A:
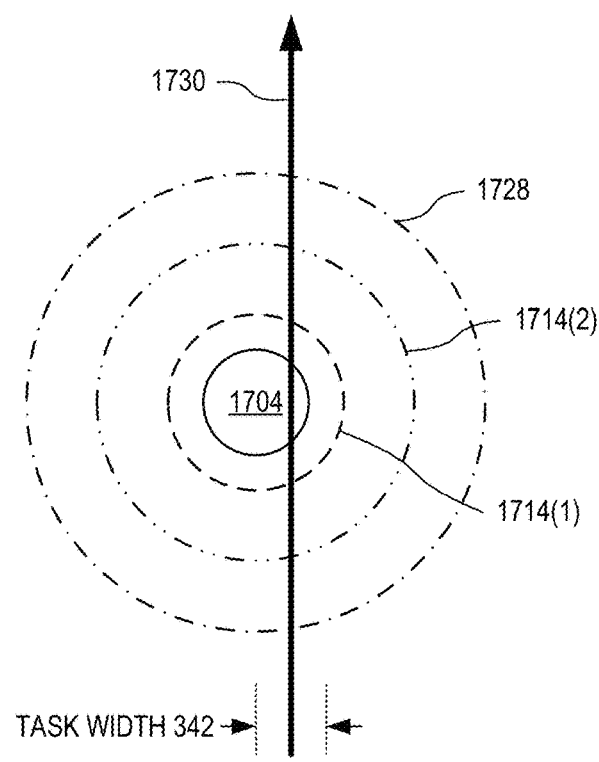
FIGS. 17A-17F shows example steps for wrapping lanes around a small obstacle, in embodiments.

As shown in FIG. 17A, a generated lane 1730 may pass through, or too close to, the ignored obstacle 1704, such that nonholonomic robot 102, should it follow lane 1730, would impact obstacle 1704. To avoid such impacts, lane wrapper 320 pushes lane 1730 away from obstacle 1704 such that nonholonomic robot 102 avoids collision with obstacle 1704. Advantageously, lane wrapper 320 is invoked for all previously ignored obstacles to allow nonholonomic robot 102 to avoid these smaller obstacles (e.g., obstacle 1704) without disrupting the operating efficiency of nonholonomic robot 102 (e.g., as compared to lost operating efficiency resulting from terminating lanes and forming cells as when avoiding larger obstacles).

Figure 17B:
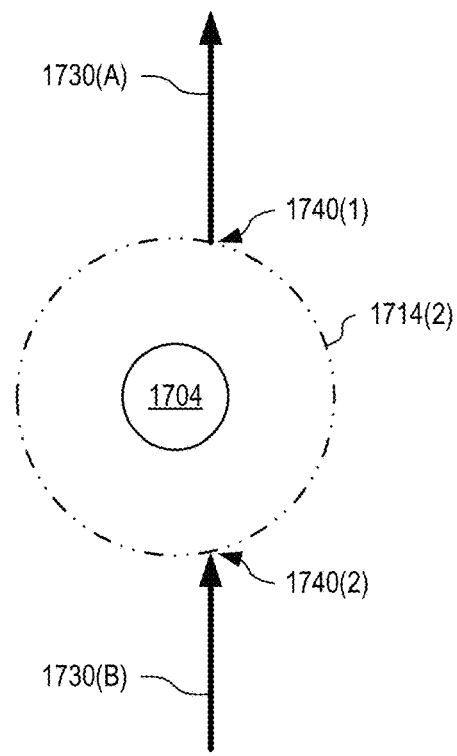
Figure 17C:
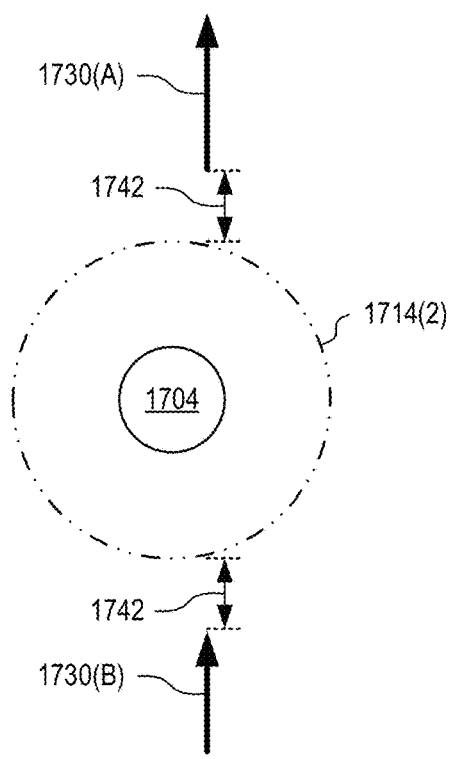
Figure 17D:
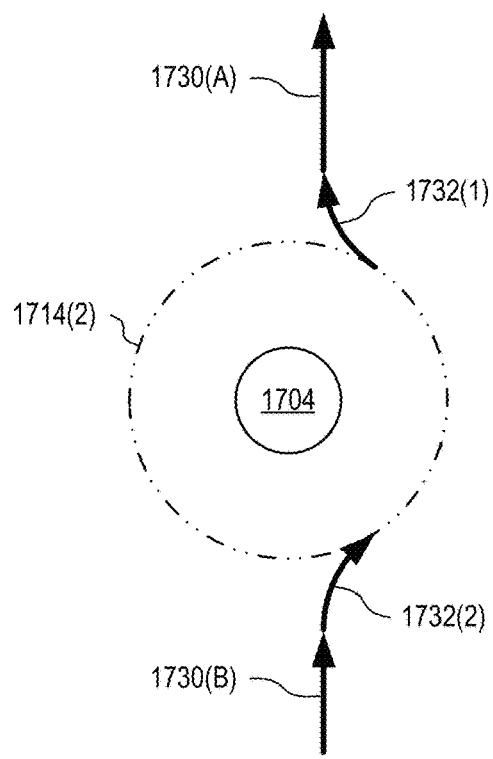

As shown in FIG. 17A (and described above) an inner lap 1714(1), outer lap 1714(2), and a soft boundary 1728 may be formed around obstacle 1704. Lane wrapper 320 uses outer lap 1714(2) to form a path for nonholonomic robot 102 to follow around obstacle 1704. FIGS. 17B-D shows example steps implemented by lane wrapper 320.

Figure 17E:
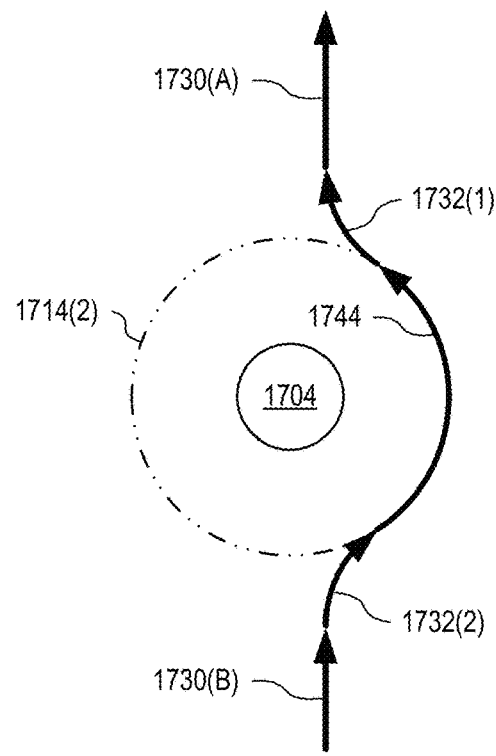
Figure 17F:
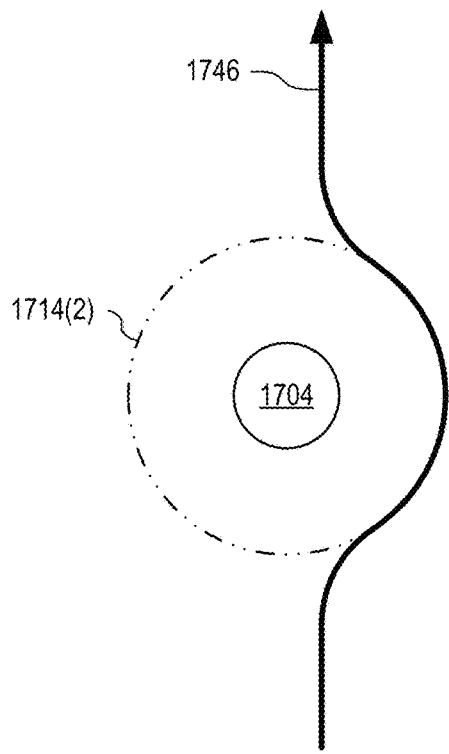

As shown in FIG. 17B, lane wrapper 320 determines intersections 1740(1) and 1740(2) of lane 1730 with outer lap 1714(2), and the portion of lane 1730 between these intersections is removed, thereby leaving first and second lane portions 1730(A) and 1730(B). FIG. 17C shows lane wrapper 320 retracting the severed ends of lane portions 1730(A) and 1730(B) from outer lap 1714(2) by a predefined distance 1742. Predefined distance 1742 may be found by testing a range of distances, generating curves onto, and off of, the path of outer lap 1714(2), then comparing the length and cumulative angle of the curves and choosing the shortest, least curved connector. As shown in FIG. 17D, lane wrapper 320 invokes curve generator 318 to generate curves 1732(2) and 1732(1) (e.g., Dubins curves) to warp lane portions 1730(B) and 1730(A) onto, and off of, the path of outer lap 1714(2). Lane wrapper 320 then determines a lap portion 1744 of outer lap 1714(2) between the end of curve 1732(2) and the start of curve 1732(1), as shown in FIG. 17E. Lane wrapper 320 then combines lane portion 1730(B), curve 1732(2), lap portion 1744, curve 1732(1), and lane portion 1730(A) to form warped lane 1746 to replace lane 1730. As appreciated, more than one lane 350 may be warped around an obstacle, and one lane may be warped more than once to avoid multiple obstacles. Advantageously, lane wrapper 320 causes a path of nonholonomic robot 102 that would otherwise intersect with a boundary to be "pushed" away from the corresponding obstacle while conforming to the minimum turning radius 364 of nonholonomic robot 102.

Lane Linking

Figure 18:
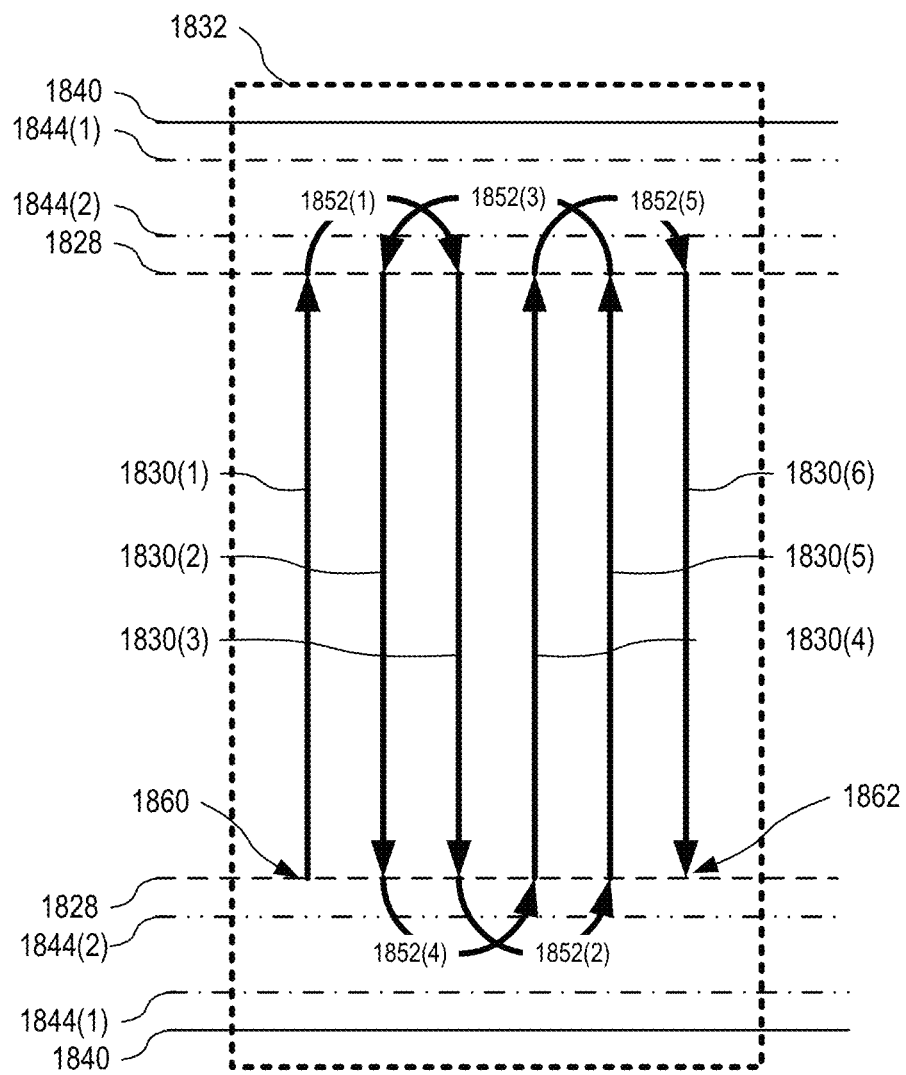
FIG. 18 shows an outer boundary of field, an inner boundary lap, an outer boundary lap, a soft boundary, and an example cell that includes six lanes, in embodiments.

FIG. 18 shows a boundary 1840 (e.g., an outer boundary of field 180), an outer boundary lap 1844(1), an inner boundary lap 1844(2), and a soft boundary 1828 (e.g., used to determine lanes) and one example cell 1832 that includes six lanes 1830(1)-(6). Cell 1832 may be formed similarly to cell 1432(2) of FIG. 14 and is an example of cells 354 of FIG. 3.

Since minimum turn radius 364 of nonholonomic robot 102 prevents the robot turning between two neighboring lanes 1830, a lane linker 322 is invoked to determine a processing order of lanes 1830 within cell 1832 to ensure that (a) every lane 1830 in the cell is traversed by nonholonomic robot 102, (b) nonholonomic robot 102 enters the cell at a given lane 1830(1), and (c) nonholonomic robot 102 exits the cell 1832 at a given lane 1830(6). Lane linker 322 may then invoke curve generator 318 to generate curves 1852 to provide a path for nonholonomic robot 102 to follow between the ordered lanes 1830. In the example of FIG. 18, starting at point 1860 (e.g., from a transit connection, such as from a previous cell, described in a following section), lane linker 322 generates a curve 1852(1) connecting an upper end of lanes 1830(1) to an upper end of lane 1830(3), a curve 1852(2) connecting a lower end of lane 1830(3) to a lower end of lane 1830(5), a curve 1852(3) connecting an upper end of lane 1830(5) to an upper end of lane 1830(2), a curve 1852(4) connecting a lower end of lane 1830(2) to a lower end of lane 1830(4), and a curve 1852(5) connecting an upper end of lane 1830(4) to an upper end of lane 1830(6), and nonholonomic robot 102 exits cell 1832 at point 1862. In one example of operation, lane linker 322 may generate an ordered list of lane indices for a given start and end location (e.g., lane) of a cell. The problem of lane linking is unique to nonholonomic robot 102 and is not present in prior art algorithms used for holonomic or zero-turn robots. Further, the first lane in the cell need not be the starting lane.

Lane linker 322 may implement the following algorithm for linking lanes 350 in one cell 354. The letter T defines the nearest lane that a robot can transition to from its current lane. Where T has a value of one, the robot is holonomic and may transition from its current lane to an adjacent lane either side; where T has a value of two, the robot is nonholonomic with a minimum turn radius 364 that cannot transition to an adjacent lane, but needs to skip at least one adjacent lane; where T has a value of three, the robot is nonholonomic with a minimum turn radius 364 that needs to skip at least two adjacent lanes; and so on. The letter W defines the number of lanes 350 in cell 364, the letter S defines the starting lane in the cell, and the letter D defines the ending lane in the cell.

Lane linker 322 generates permutations of possible lane orders (e.g., a list) based upon the values of T, W, and S (e.g., where D is determined based upon the generated order). For example, where T=2, W=5, and 5=1, lane linker may generate a first list [1, 2, 5, 2, 4], a second list [1, 4, 2, 5, 3], and so on, where each integer in the list represents a lane index (e.g., 1-5, since W=5). For a given cell, T and W remain constant, but S may vary, as may the determined D.

The list of lane indices is easier for a human to follow, however, lane linker 322 may generate the lists in other formats, such as a transition block that includes a list of lane index differences relative to the starting lane S. In the above example, the first list is output as a first transition block [2, 2, −3, 2] and the second list is output as a second transition block [3, −2, 3, −2]. Accordingly, T is the minimum absolute value that can be included in any transition block, since it defines the minimum possible step. For example, when T=2, each value in the transition block is either (a) two, or greater, or (b) minus-two, or less.

Each transition block defines the total headland traversals required by the robot to visit each lane in the cell. A sum of the absolute values in the transition block defines a cost heuristic for that permutation. Continuing with the above example, the first transition block has a cost of nine, and the second transition block has a cost of ten. For all transition block permutations for any cell, the transition block with the lowest cost may be selected. For a given values of T, there is a minimum value of W that results in each lane being visited once and only once (e.g., single-time visited), and where a lower value of W means that lane linker 322 cannot link all the lanes in the cell. Further, in searching for minimum cost transition block for each possible value of W, S, and D (since T remains constant), lane linker 322 need only generate permutations in the range of min(W)–(min (W)–1), after which solutions in that range may be reused to construct larger cell sizes. For example, where T=2 and field 180 has two cells 364, having corresponding W values of five and ten, lane linker 322 need only generate permutations until W=5, as solutions for W=10 can be constructively found from the previous solution to W=5, since a solution for W=5, where S=1 and D=5 cannot be simply repeated for W=10 since the second half of the cell cannot start in a lane adjacent to the ending lane of the first half. However, other previously generated transition blocks provide the result for W=10. During processing of cells 364 of field 180, lane linker 322 stores transition block solutions for values of T, W, S, and D, such that repeated searches for solutions are not needed, thereby improving runtime of the algorithm.

Where a first and second cell are to be processed consecutively, the second cell cannot start with a lane that is adjacent to the finishing lane of the first cell if the first cell ends on the last lane, but could be possible with another transition block that ends on the second to last lane. Accordingly, the corresponding cell graph (see FIG. 21), used to determine transits between cells, has increased complexity where Tis two or higher as compared to cell graphs where Tis one.

In the example of FIG. 18, cell 1832 has an even number of lanes 1830 and is therefore called a "straight cell" since nonholonomic robot 102 exits at the same end (top or bottom) at which the robot entered (but at an opposite side—left or right). Cells that have an odd number of lanes are called a "cross cell" since, after processing the cell, the robot will end up on the opposite end (top or bottom) from which it entered.

Cell Post Processing

As described above, lane generator 316 determines at least one cell for field 180. And, when implementing island detection and resolution, lane generator 316 may further divide field 180 into more cells. Certain boundary and obstacle shapes may result in small cells, and/or similarly shaped adjacent cells. Under certain circumstances, to improve efficiency of nonholonomic robot 102 processing field 180, some adjacent cells may be merged. Accordingly, path program generator 310 may include a cell processor 324 that post-processes cells (e.g., cells 1632 of FIG. 16) and merge certain cells together where efficiency of nonholonomic robot 102 may be improved.

FIGS. 19A and 19B show merging of two cells formed by a boundary shape. FIG. 19A shows an example boundary 1904 with an inner headland lap 1924(1), an outer headland lap 1824(2), and a soft boundary 1928. In this example, a shape (e.g., a concave portion 1902) of boundary 1904, and thus soft boundary 1928, causes lane generator 316 to form two cells 1932(1) and 1932(2) (e.g., based upon scan line intersection with soft boundary 1928). Cells 1932 are examples of cells 354 of FIG. 3. As shown, cell 1932(1) includes lanes 1930(1)-(3) and cell 1932(2) includes lanes 1930(4)-(6). Since nonholonomic robot 102 processes lanes in one cell before starting lanes in a next cell, nonholonomic robot 102 would follow short lanes 1930 and require more turns.

Cell processor 324 is invoked to identify adjacent cells 1932(1) and 1932(2) that resulted from a common soft boundary 1928 corresponding to outer boundary 1940 and that have three lanes or fewer. Cell processor 324 then determines whether the cells could be merged by pushing lanes through soft boundary 1928, without violating (e.g., getting too close to) boundary 1940. In one example of operation, cell processor 324 traces soft boundary 1928 and an order that cell vertices (defined by the top and bottom ends of the first and last lanes in each cell 1932) intersect with soft boundary 1928 are considered. Patterns in these intersections define how the cells are interacting with soft boundary 1928. In one example, as shown in FIG. 19, when tracing soft boundary 1928 in a clockwise direction, vertices bottom-left and top-left of cell 1932(2) are encountered first, and then bottom-left and top-left of cell 1932(1). Cell processor 324 determines from this encounter sequence that cells 1932(1) and 1932(2) may merge by pushing lanes through soft boundary 1928.

FIG. 19B shows where cells 1932(1) and (2) of FIG. 19A are merged into a single cell 1933 by linearly extending lanes 1930(1)-(3), through soft boundary 1928, to meet and join with lanes 1930(4)-(6), respectively, thereby forming longer (and therefore more efficient) lanes 1930(7)-(9) of cell 1933. As shown in FIG. 19B, lane 1930(7) is always at least a half of task width 184 from boundary 1940 and therefore nonholonomic robot 102, when following lane 1930(7), does not cross boundary 1940. Advantageously, nonholonomic robot 102 performs more efficiently when following longer lanes, and thus cell processor 324 improves performance of the robot for field 180.

FIGS. 20A and 20B show further example operation of cell processor 324 to merge two cells that share two corners on a common side. Continuing the example of FIG. 16C, FIG. 20A shows where cells 1632(7) and 1632(10) share corners 2002 and 2004 on a common side 2006. Accordingly, as shown in FIG. 20B, cell processor 324 merges cells 1632(7) and 1632(10) of FIG. 20A into a single cell 2032(1). Similarly, cells 1632(9) and 1632(12) share corners 2008 and 2010 on a common side 2012 and therefore cell processor 324 merges cells 1632(9) and 1632(12) of FIG. 20A into a single cell 2032(2), as shown in FIG. 20B. Cells 2032 are examples of cells 354 of FIG. 3. Cell processor 324 may be applied repeatedly, and/or recursively, whereby cells 2032(1) and 1632(5) may be merged into a single cell (not shown) because they share corners 2014 and 2016 on a common side 2018.

Cell processor 324 may also add at least one lane 350 to any cell 354 that has less than four lanes. For example, since nonholonomic robot 102 cannot cut adjacent lanes, a cell with three lanes cannot be linked by lane linker 322. Accordingly, cell processor 324 adds extra lanes by duplicating outermost lanes outwards until the cell has four lanes. For example, cell processor 324 may attempt to duplicate a left most lane of the cell one task width to the left. The attempt is unsuccessful when the added lane intersects a boundary. If unsuccessful, cell processor 324 may attempt to duplicate a right most lane of the cell one task width to the right. The attempt is unsuccessful when the added lane intersects a boundary. Accordingly, the cell may be extended (e.g., by overlapping another cell) in either direction until it has enough lanes to allow lane linker 322 to successfully link all lanes.

Cell Transits

As described above, each cell groups lanes that may be collectively followed by nonholonomic robot 102, and thus each cell represents an area where nonholonomic robot 102 performs its task over a determined sequence of lanes 350 in that cell. Nonholonomic robot 102 may also perform its task while following headland laps 344 and, if any, obstacle laps 346. Accordingly, to perform all tasks for field 180, control of nonholonomic robot 102 may also include transits 356 that control nonholonomic robot 102 to move between areas or laps where tasks are performed. For example, a transit 356 may move nonholonomic robot 102 to a starting point of a first cell 354; nonholonomic robot 102 is then controlled to follow lanes 350 and curves 352 of that cell; and a next transit 356 may move nonholonomic robot 102 from the finishing point in that cell to a starting point of the next cell, and so on, until all cells have been processed. A next transit 356 may move nonholonomic robot 102 to process laps 344/346, for example. Nonholonomic robot 102 may also be controlled to process laps 344/346 prior to processing cells 354 without departing from the scope hereof.

Using the example of FIG. 14, field 180 has four cells 1432(1)-(4). For each cell 1432, cell processor 324 determines cell vertices (e.g., top left 1402, bottom left 1404, top right 1406, bottom right 1408 for cell 1432(4)) using endpoints of the first and last lanes in the cell. For example, as shown in FIG. 13, lane 350(1) is a first lane of cell 1432(1), and intersections 1340(1) and 1340(2) represent top left and bottom left vertices of cell 1432(1). Accordingly, each cell 1432 has four corresponding vertices.

Figure 21A:
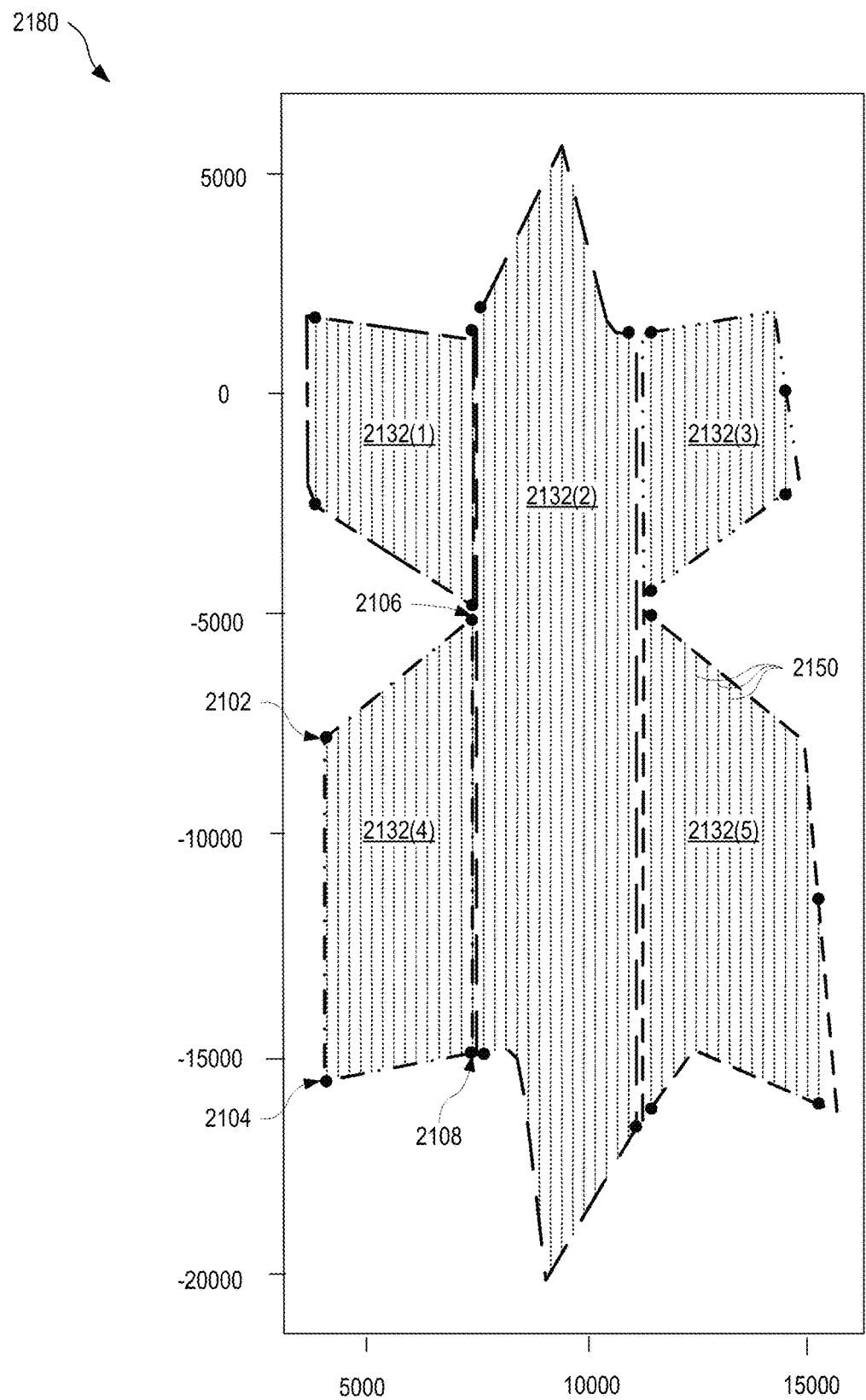
FIG. 21A is a graph illustrating an example field with five cells and generated lanes, in embodiments.
Figure 21B:
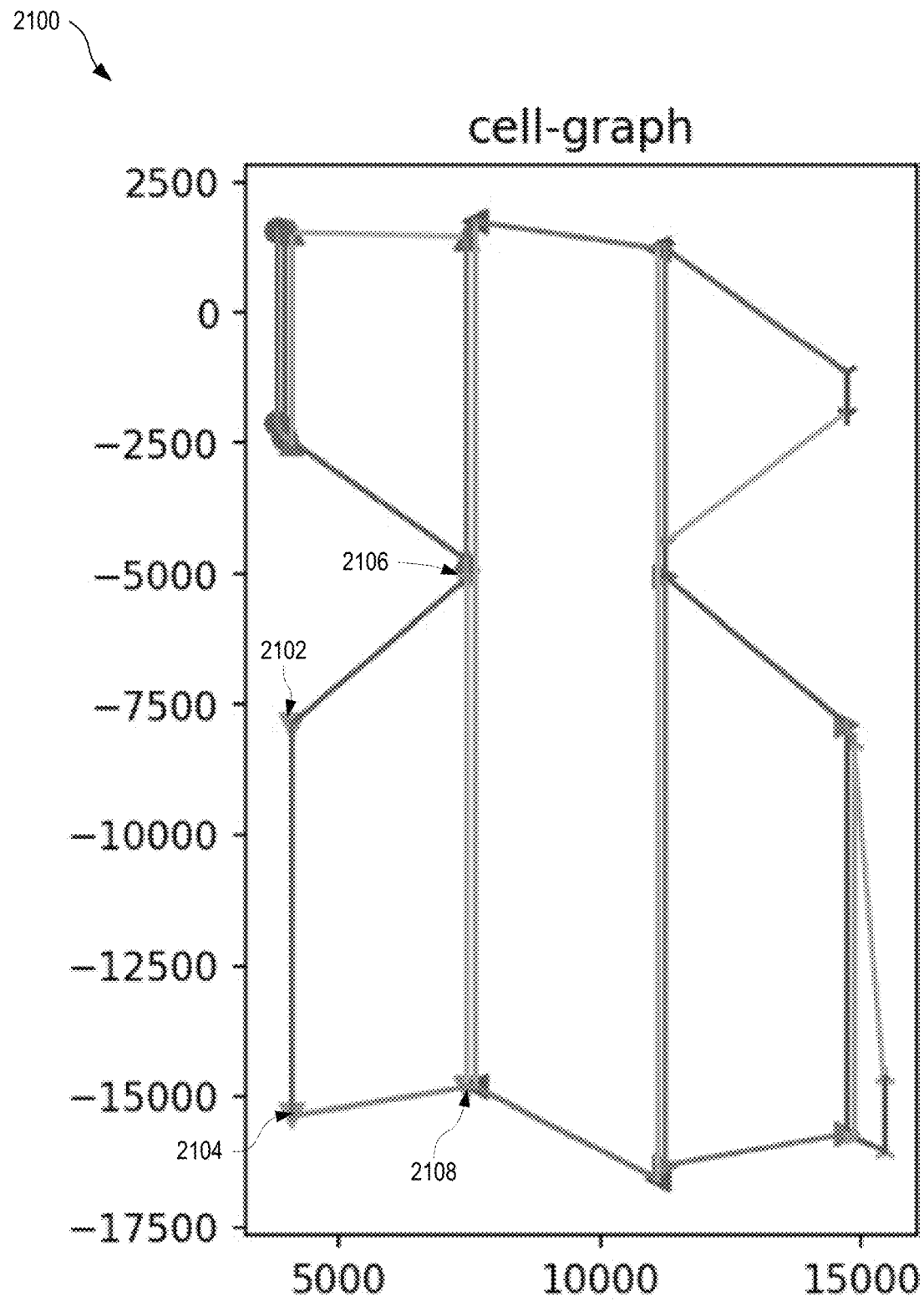
FIG. 21B is one example cell graph generated from vertices of the cells of FIG. 21A, in embodiments.

FIG. 21A is a graph illustrating an example field 2180 with five cells 2132(1)-(5) and generated lanes 2150. FIG. 21B is one example cell graph 2100 generated from vertices of cells 2132 of FIG. 21A. FIGS. 21A and 21B are best viewed together with the following description.

In this example, cell 2132(4) has a top left vertex 2102, a bottom left vertex 2104, a top right vertex 2106, and a bottom right vertex 2108. Cell graph 2100 is an example of cell graph 366 of FIG. 3. (Vertices of other cells are shown but not labelled for clarity of illustration.) To determine an order for processing each cell 2132, cell processor 324 generates cell graph 2100 that connects each of the cell vertices (e.g., vertices 2102, 2104, 2106, and 2108) internally and with other cells by tracing along each boundary and measuring the distance between each cell vertex. The edges, or connections between these vertices, are assigned a value that represents the distance between these vertices. Cell graph 2100 is specifically concerned with connectivity between cells, and therefore does not necessarily represent the cell itself.

Cell processor 324 analyzes cell graph 2100 to determine an order for nonholonomic robot 102 to process (e.g., perform task 182) cells 2132 that is shortest (time and/or distance) and therefore the most efficient, taking into account the type of each cell (e.g., straight or cross) that defines a finishing vertex for the cell given the starting vertex, and where each cell 2132 is processed only once (e.g., single-time visited). A traditional travelling salesman graph traversal algorithm cannot be used because of the physical restrictions of nonholonomic robot 102. Therefore, cell processor 324 implements a modified travelling salesman graph traversal algorithm to generate a step list 368 from cell graph 2100. Accordingly, cell processor 324 considers the physical restrictions of nonholonomic robot 102 when determining a shortest path for processing field 2180. For example, the minimum turning radius 364 of nonholonomic robot 102 is considered when determining the order of cells and their corresponding lane-order permutation since, for adjacent/consecutive cells, the finishing vertex of the earlier cell must be sufficiently spaced from the starting vertex of the latter cell to allow the nonholonomic robot 102 to make the turn. When the finishing vertex and the starting vertex are not sufficiently spaced to allow the nonholonomic robot 102 to turn between them, the combination of those cells and lane-order permutations are skipped.

For the determined shortest path through cell graph 2100, cell processor 324 generates an ordered step list 368 that identifies cell vertices for start and finish points of each cell. Using step list 368, cell processor 324 then generates transits for moving nonholonomic robot 102 between cells 2132. For example, from a given starting point, cell processor 324 adds a first transit to step list 368 to move nonholonomic robot 102 from the starting point to the starting vertex of the first cell, a next transit is added to move nonholonomic robot 102 from the finish vertex of the first cell to a starting vertex of the next cell, and so on. Cell processor 324 also adds transits to laps, the lap itself (e.g., one of headland laps 344 and obstacle lap 346), and transits from the lap to a next lap or a transit to a finishing location.

Figure 22:
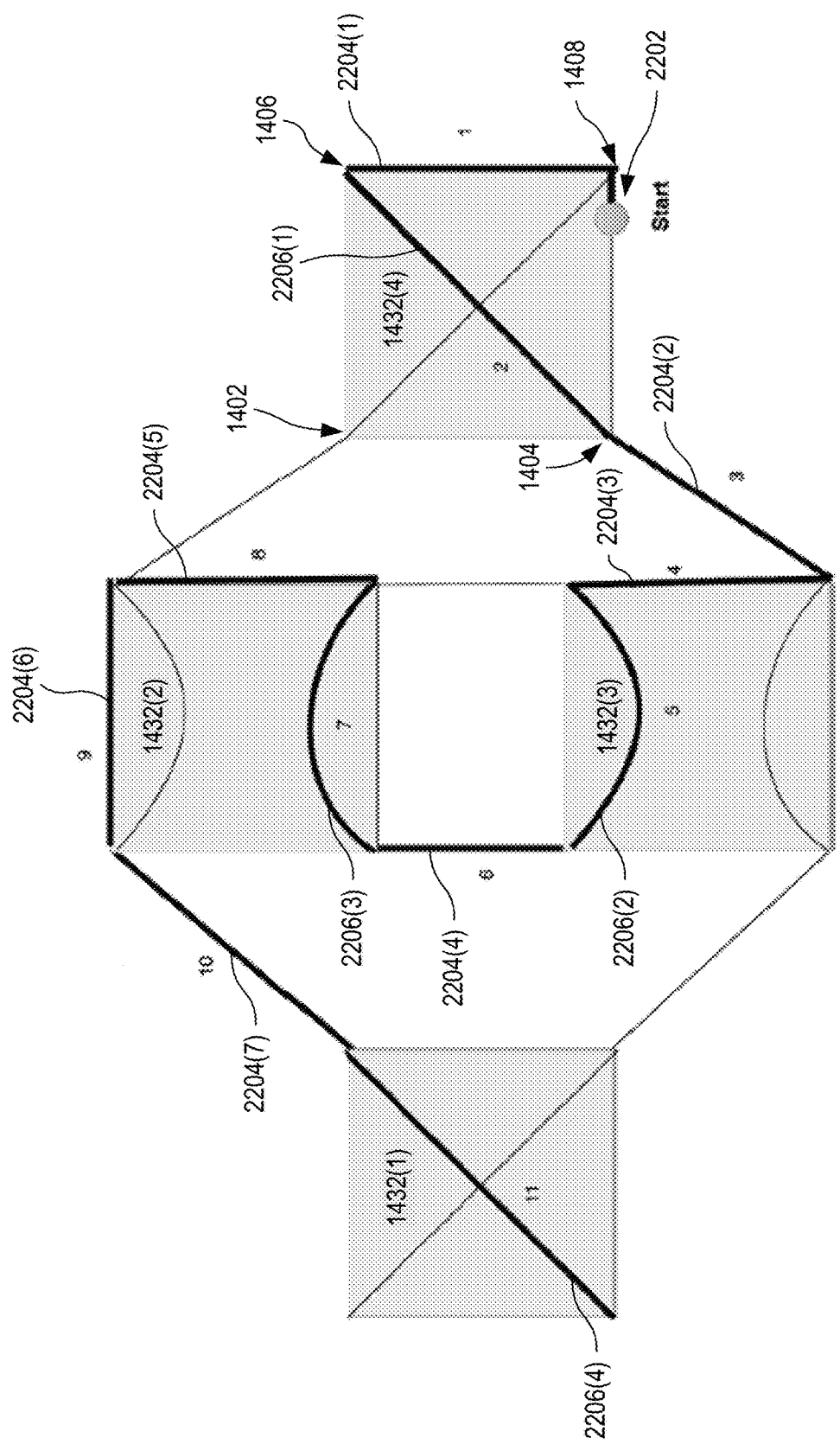
FIG. 22 is a schematic illustrating one example sequence of transits and corresponding tasks defined by the step list of FIG. 3, in embodiments.
Figure 23A:
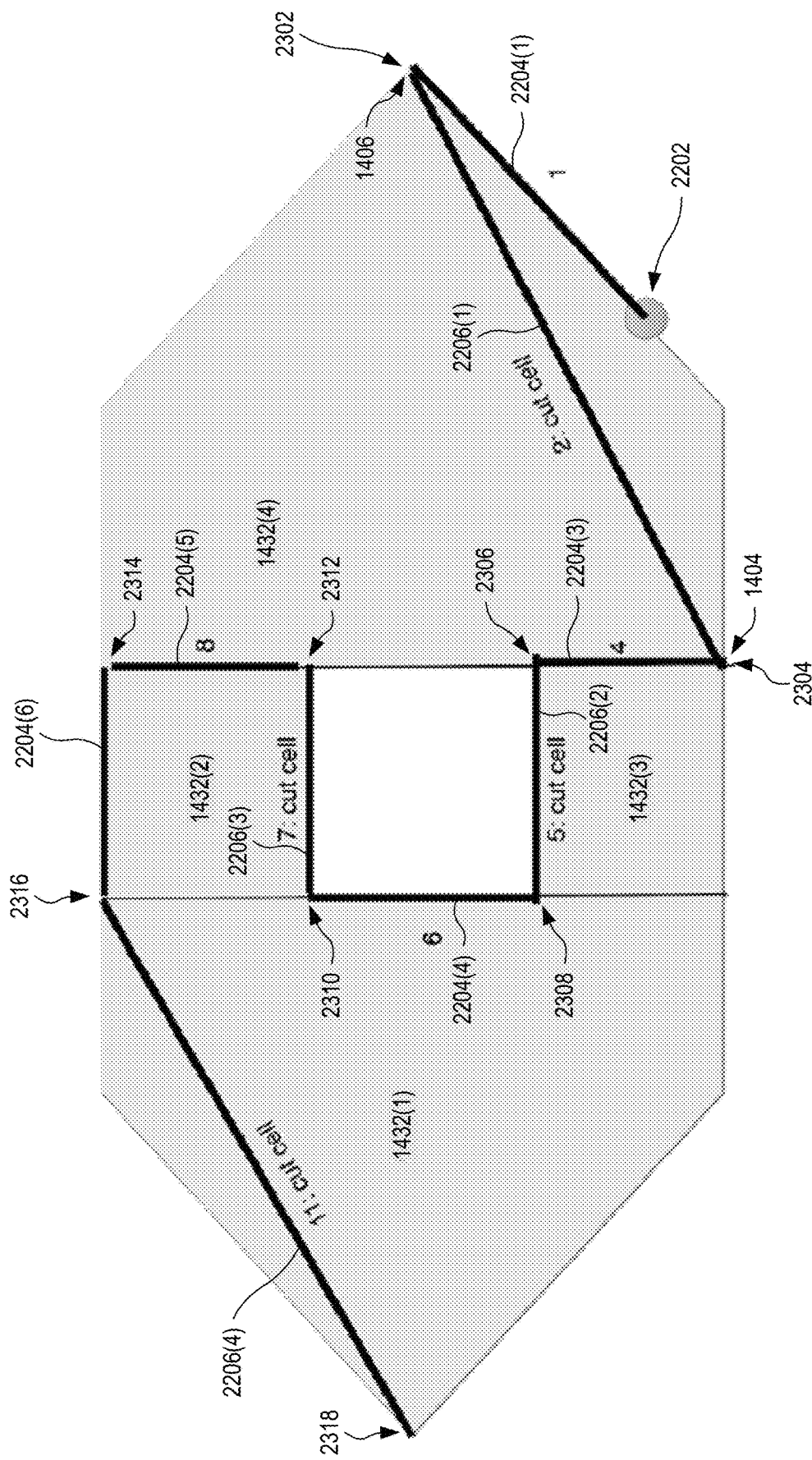
FIG. 23A illustrates the transits and tasks of FIG. 22 in relation to the real shape of the field, in embodiments.

FIGS. 22 and 23A illustrate one example sequence of processing cells 1432, FIG. 14, of field 180 based upon step list 368. FIG. 22 is a schematic illustrating one example sequence of transits 2204 and processes 2206 defined by step list 368 for an example start point 2202 of nonholonomic robot 102. FIG. 23A illustrates the transits 2204 and processes 2206 of FIG. 22 in relation to real shape of field 180. FIGS. 22 and 23A are best viewed together with the following description.

Lane linker 322, described above, may not be invoked to link lanes 350 of a cell until a starting vertex is determined from cell graph 2100 by cell processor 324. For example, cell processor 324 may select a starting vertex of each cell to minimize transits 2204 between cells, where based upon the type of cell (e.g., straight or cross), the corresponding finishing vertex is determined for the given starting vertex. Once the starting vertex is selected for a cell 354, the direction of movement of nonholonomic robot 102 along each lane 350 in that cell may be determined and curves 352 connecting the lanes may be generated.

From start point 2202 (e.g., a gate to field 180, a shed housing nonholonomic robot 102, etc.), a first transit 2204(1) moves nonholonomic robot 102 to a start position 2302 (top right vertex 1406) for processing cell 1432(4), which is a cross type of cell. Cell 1432(4) is then processed 2206(1), finishing at position 2304 (bottom left vertex 1404). Since a finishing vertex of cell 1432(4) coincides with a vertex of cell 1432(3) at position 2304, transit 2204(2) is not required (e.g., zero length). A transit 2204(3) then moves nonholonomic robot 102 along a vertical edge of cell from position 2304 to a start position 2306 for processing cell 1432(3). Transits may be made along either vertical side of each cell when necessary. Nonholonomic robot 102 is controlled to process 2206(2) cell 1432(3), a straight cell, finishing at position 2308. A transit 2304(4) moves nonholonomic robot 102 to a start position 2310 for processing cell 1432(2), and nonholonomic robot 102 is controlled to process 2206(3) cell 1432(2), a straight cell, finishing at position 2312. Transits 2204(5) and 2204(6) move nonholonomic robot 102 around a perimeter of cell 1432(2), via vertex position 2314, to a starting position 2316 of cell 1432(1). Nonholonomic robot 102 is then controlled to process 2206(4) cell 1432(1), finishing at position 2318. Further transits may be added to move nonholonomic robot 102 to a final location (e.g., back to start point 2202) if defined.

Figure 23B:
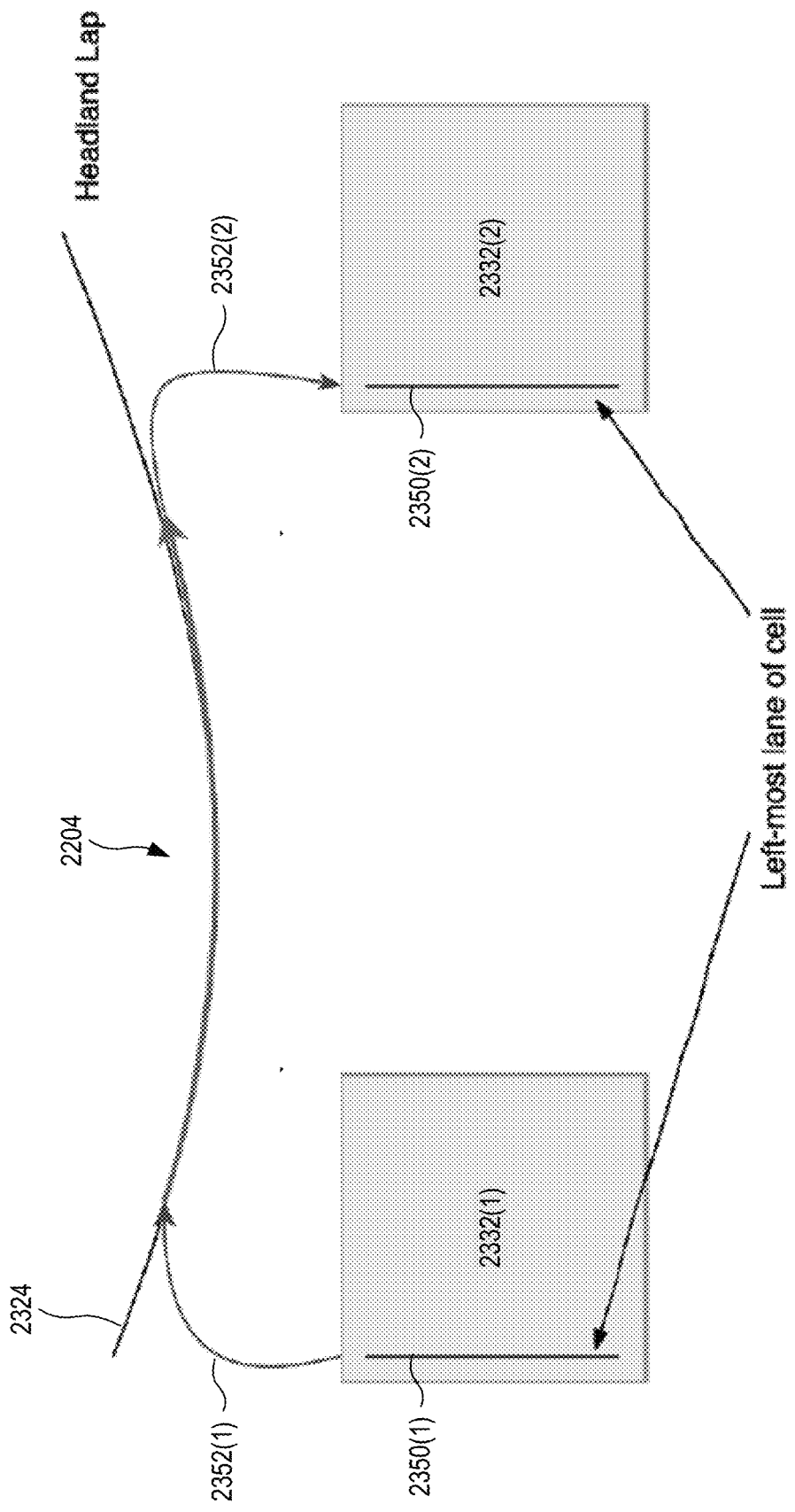
FIG. 23B is a schematic illustrating one example transit between a left-most lane of a first cell and a left-most lane of a second cell via a portion of a boundary lap, in embodiments.

Transits between cells 354 may preferably follow one or more headland laps 344 and obstacle laps 346 (so as not to disturb the striped patterns generated as a side-effect of the task being performed). FIG. 23B is a schematic illustrating one example transit 2204 between a left-most lane 2350(1)

of a first cell 2332(1) and a left-most lane 2350(2) of a second cell 2332(2) via a portion of a boundary lap 2324. In the example of FIG. 23B, cell processor 324 determines transit 2204 between a top vertex of lane 2350(1) of first cell 2332(1) to a top vertex of lane 2350(2) of second cell 2332(2). In this example, both cells 2332 are near headland lap 2324 and cell processor 324 invokes curve generator 318 to generate a first curve 2352(1) (e.g., a Dubins curve or modification thereof) from top vertex of lane 2350(1) to headland lap 2324 and to generate a second curve 2352(1) (e.g., a Dubins curve or modification thereof) from headland lap 2324 to top vertex of lane 2350(2). Cell processor 324 then generates points along headland lap 2324 between the first and second curves 2352. Although the example of FIG. 23B shows transits from the left-most lanes, transits may occur from either of two left-most lanes, and either of two right most lanes of each cell. That is, that first and last lanes to be processed in each cell is not limited to the outermost lanes of the cell.

Adding Laps

Cell processor 324 may also add headland laps 344 and obstacle laps 346, with necessary transits, at the end of step list 368. In certain embodiments, headland laps 344 and/or obstacle laps 346 may be added to the front of step list 368 or inserted between processing of cells 354. Each headland lap 344 and/or obstacle lap 346 added to step list 368 defines a portion of the path that nonholonomic robot 102 is to follow to process field 180.

Finalize Path

Once all parts of the path for nonholonomic robot 102 to follow to process field 180 have been defined within step list 368, path program generator 310 processes step list 368 to generate a finalized path program 122. Each step within step list 368 represents one of: a boundary transit 356, a group of lanes 350 and linking curves that form a process path through cell 354, a headland lap 344, and, where field 180 includes an obstacle, an obstacle lap 346. Each step defines a path using a sequence of points (e.g., a list of coordinates in the two-dimensional plane). For example, a boundary transit contains points that define an on-ramp curve, points defining the path along the boundary lap in the direction towards the next task, and points defining an off-ramp curve to the next task, where the curves are similar to Dubins curves.

The path through the cell is generated by invoking lane linker 322, described above, for the defined start vertex, wherein lane linker 322 generates a list of points along a path that follows all lanes linked by curves (e.g., Dubins curves) such that all lanes in the cell are visited and where the path starts on one of the first two lanes in the cell and ends on one of the last two lanes in the cell. Where a lane goes through a small obstacle ignored by lane generator 316, lane wrapper 320 is invoked to generate points for a path around the obstacle as described above.

The path of each headland lap 344 includes points defining an on-ramp curve (e.g., a Dubins curve) onto the lap, and all the points that form the path around the lap. A transit may then define a path from the finished lap onto a next lap or to a finish position.

Cell processor 324 then processes step list 368 to determine a list of points resulting from appending the points from each successive step in order. Cell processor 324 then removes duplicate points and converts the points from the two-dimensional plane into latitude/longitude coordinates to generate path program 122.

Path program 122 is transferred to nonholonomic robot 102, where it controls nonholonomic robot 102 to process field 180.

Field Coverage Algorithm

Figure 24:
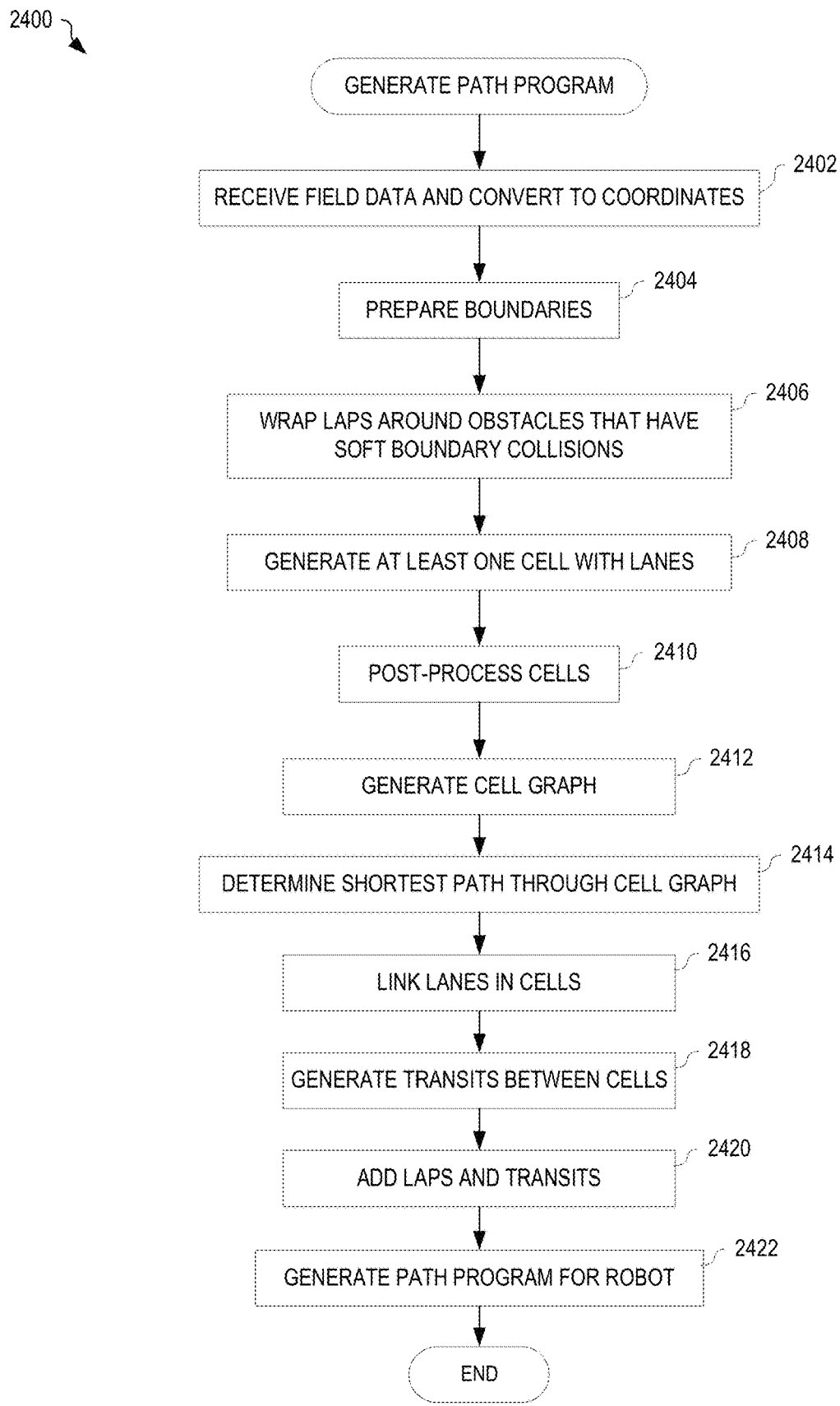
FIG. 24 is a flowchart illustrating one example method for generating the path program of FIG. 1, in embodiments.

FIG. 24 is a flowchart illustrating one exemplary nonholonomic robot field coverage method 2400. Method 2400 is implemented by path program generator 310 of ROC 120 for example.

In block 2402, method 2400 receives field data and converts it to coordinates. In one example of block 2402, boundary tool 314 converts field data 154, including an external boundary 340 and obstacles 342 (if any) of field 180, into coordinates of a two-dimensional plane to simplify processing, and may thin point densities of boundary 340 and obstacle 342 by applying Ramer-Douglas-Peucker. In block 2404, method 2400 prepares boundaries. In one example of block 2404, boundary tool 314 rotates, within the two-dimensional plane, boundary 340 and obstacles 342 based upon fill angle 360, such that lanes 350 will be generated parallel to the y-axis (vertical). Path program generator 310 may also invoke boundary tool 314 to adjust boundary 340 to absorb (hard-swallow as shown for obstacle 710(1) in FIG. 7) obstacles that are close to boundary 340. Path program generator 310 may also invoke lap generator 312 to generate, based on boundary 340, one or more headland laps 344, and to generate, based on obstacle 342, one or more obstacle laps 346. Path program generator 310 may also invoke lap generator 312 to generate at least one soft boundary 348 based upon boundary 340 and at least one soft boundary 348 based upon obstacle 342.

In block 2406, method 2400 wraps laps around obstacles that have soft boundary collisions. In one example of block 2406, where a headland lap 344 intersects a soft boundary 348 of an obstacle 342, the path of the lap is adjusted to wrap the lap around the obstacle, using a process that is similar to lane wrapping, as shown in FIGS. 17A-17F.

In block 2408, method 2400 generates at least one cell with lanes. In one example of block 2408, path program generator 310 invokes lane generator 316 to generate at least one cell 354 with lanes 350. In block 2410, method 2400 post processes cells generated in block 2408. In one example of block 2410, path program generator 310 invokes cell processor 324 to push through cells that have three lanes or fewer by letting them traverse a boundary, merge neighboring cells that share two corners on a given side, and add lanes to any cell that has fewer than four lanes. In block 2412, method 2400 generates a cell graph. In one example of block 2412, path program generator 310 invokes cell processor 324 to generate cell graph 366 that connects each of the cell vertices internally and with other cells by tracing along each boundary and measuring the distance between each cell vertex. The edges, or connections between these vertices, are assigned a value that represents the distance along these vertices.

In block 2414, method 2400 determines a shortest path through the cell graph, ensuring that each cell is covered once (e.g., single-time visited). In one example of block 2414, path program generator 310 invokes cell processor 324 to analyzes cell graph 2100 to determine a processing order for nonholonomic robot 102 to process each cell 1432 once and that is the shortest (time and/or distance) path. Cell processor 324 then generates step list 368 defining cell start and finish vertices, where the type of cell (e.g., straight or cross) defines a finishing vertex for the cell given the selected starting vertex. In block 2416, method 2400 links lanes in cells. In one example of block 2416, path program generator 310 invokes lane linker 322 to determine a processing order of lanes within each cell, ensuring that (a) every lane in the cell is traversed by nonholonomic robot 102, (b) that nonholonomic robot 102 enters the cell at a given lane, and (c) that nonholonomic robot 102 exits the cell at a given lane. Lane linker 322 may then invoke curve generator 318 to generate curves to provide a path for nonholonomic robot 102 to follow between the ordered lanes. Where a lane 350 intersects an obstacle 342, previously ignored by lane generator 316 because the obstacle is less than two task widths wide, lane linker 322 may invoke lane wrapper 322 to wrap the lane around the obstacle, as described above with respect to FIGS. 17A-17F.

In block 2418, method 2400 generates transits between cells. In one example of block 2418, cell processor 324 adds a first transit to step list 368 to move nonholonomic robot 102 from the starting point to the starting vertex of the first cell, a next transit is added to move nonholonomic robot 102 from the finish vertex of the first cell to a starting vertex of the next cell, and so on. In block 2420, method 2400 adds laps and transits. In one example of block 2420, cell processor 324 adds headland laps 344 and obstacle laps 346, with necessary transits, to step list 368.

In block 2422, method 2400 generates the path program for the robot. In one example of block 2422, path program generator 310 processes the steps step list 368 to generate a finalized path program 122 to control nonholonomic robot 102. Path program 122 may include points (e.g., converted to geographical coordinates) along the path that nonholonomic robot 102 is to follow, and may include controls directives for operating components of nonholonomic robot 102 that perform the required task (e.g., cutting grass) at required positions along the path.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combinations of Features

The features and method steps herein described may be present in embodiments in many combinations. Among those combinations are:

(A) A field coverage method for a nonholonomic robot to process a field using parallel lanes, includes receiving field data defining (a) a plurality of geographical locations along a field boundary of the field and (b) a plurality of geographical locations along an obstacle boundary for each obstacle in the field; converting the field data to two-dimensional coordinates defining the field boundary and each of the obstacle boundaries; generating at least one headland lap relative to, and within, the field boundary, the headland lap defining at least one path around the field boundary for the nonholonomic robot to follow; generating one soft boundary relative to, and within, the field boundary, the soft boundary defining lane end points that provide space for the nonholonomic robot to turn between lanes without traversing the field boundary; for each of the obstacles, generating (a) at least one obstacle lap relative to and around the obstacle boundary, and (b) one soft boundary relative to, and around, the obstacle boundary defining lane end points that provide space for the nonholonomic robot to turn between the lanes without traversing the obstacle boundary; determining, using a cellular decomposition algorithm, a plurality of cells each having a plurality of parallel lanes bounded by the soft boundaries; determining, within each of the plurality of cells, permutations of lane processing orders that allow the nonholonomic robot to transition between a finishing point of one lane and a starting point of a next lane based upon a minimum turning radius of the nonholonomic robot, wherein each lane processing order defines, for that permutation, a starting vertex of a first lane in the lane processing order and a finishing vertex of a last lane in the lane processing order; generating a cell graph connecting the plurality of cells based upon the permutations of lane processing orders of each cell; determining, based upon a modified travelling salesperson algorithm, a shortest path through each cell graph that visits each of the plurality of cells once; generating a step list defining movement of the nonholonomic robot along each lane in each cell of the shortest path through the cell graph; generating transits between the plurality of cells on the shortest path and adding the transits to the step list; adding transits between the lanes of the lane processing order for each cell to the step list; adding laps to the step list; and generating, based upon the step list, a path program to control the nonholonomic robot to process the field.

(B) A field coverage method for a nonholonomic robot to process a field divided into a plurality of cells, includes determining, for each of the plurality of cells, permutations of lane processing orders based upon a minimum turning radius of the nonholonomic robot, each permutation defining a starting vertex of a first lane in the lane processing order and a finishing vertex of a last lane in the lane processing order; generating a cell graph connecting the starting vertex of each of permutation for each cell with the finishing vertex of each of the permutations of the other cells; determining a shortest path through the cell graph that single-time visits each of the plurality of cells; generating a step list defining a path for the nonholonomic robot to follow shortest-path lanes of each of the plurality of cells based upon its lane processing order; adding, to the step list, at least one lap adjacent to, and inside of, a field boundary of the field for the nonholonomic robot to follow; and generating, based upon the step list, a path program to control the nonholonomic robot to process the field.

(C) The field coverage method denoted as (B), further includes generating one soft boundary relative to, and within, the field boundary of the field; and determining, using a cellular decomposition algorithm and based at least in part on the soft boundary, the plurality of cells within the field, and for each of the plurality of cells, the lanes being determined based upon a processing width of the nonholonomic robot.

(D) In either of the field coverage methods denoted as (B) or (C), the determining the plurality of cells further includes detecting islands created by the cellular decomposition algorithm from either (a) different boundaries, or (b) a common boundary; and forcing a cell division for each detected island.

(E) Any of the field coverage methods denoted as (B)-(D), further including generating, for each of at least one obstacle located in the field, one obstacle soft boundary relative to, and around, a boundary of the at least one obstacle; wherein the cellular decomposition algorithm determines the cells and lanes using the one obstacle soft boundary.

(F) In any of the field coverage methods denoted as (B)-(E), determining the shortest path further includes skipping a combination of two consecutive cells when a distance between the finishing vertex of the earlier of the two consecutive cells and the starting vertex of the latter of the two consecutive cells does not conform to the minimum turning radius of the nonholonomic robot.

(G) In any of the field coverage methods denoted as (B)-(F), generating the step list further includes generating, for each of the plurality of cells on the shortest path, a transit between each pair of consecutive lanes in the lane processing order of the cell; and adding the transit to the step list.

(H) In any of the field coverage methods denoted as (B)-(G), generating the step list further includes generating, for each pair of consecutive cells in the shortest path, a transit between the finishing vertex of the earlier cell of the pair of consecutive cells and the starting vertex of the latter of the pair of consecutive cells; and adding the transit to the step list.

(I) In any of the field coverage methods denoted as (B)-(H), the generating the transit between pairs of consecutive lanes includes generating a first curve between a finishing end of the earlier of the pair of consecutive lanes to a boundary lap and generating a second curve between the boundary lap and a starting end of the latter of the pair of consecutive lanes.

(J) In any of the field coverage methods denoted as (B)-(I), the first curve and the second curve each include a Dubins curve.

(K) In any of the field coverage methods denoted as (B)-(J), the first curve and the second curve each being in a direction of the second lane.

(L) In any of the field coverage methods denoted as (B)-(K), for each of the permutations of lane processing orders for each of the plurality of cells, the starting vertex is located at a starting end of a starting lane of the lane processing order and the finishing vertex is located at a finishing end of a finishing lane of the lane processing order.

(M) In any of the field coverage methods denoted as (B)-(L), the starting end and the finishing end being at the same end of the cell when a number of lanes in the cell is even, and the starting end and the finishing end being at opposite ends of the cell when the number of lanes in the cell is odd.

(N) Any of the field coverage methods denoted as (B)-(M), further including, prior to determining the permutations of lane processing orders, merging adjacent cells that share two corners on a common side.

(O) Any of the field coverage methods denoted as (B)-(N), further including receiving field data defining geographic locations of a plurality of points around the field boundary; and converting the geographic locations to points on a two-dimensional plane, wherein the steps of determining, generating and adding process the points on the two-dimensional plane, and wherein the step of generating the path program further comprises converting the points defined within the step list into geographical locations.

(P) Any of the field coverage methods denoted as (B)-(0), further including, prior to converting the geographic locations, rotating the field boundary by a fill angle that defines a direction of movement for the nonholonomic robot within the field, wherein the lanes of each of the plurality of cells are generated parallel to an X axis of the two-dimensional plane.

(Q) Any of the field coverage methods denoted as (B)-(P), further including determining, based upon the minimum turning radius and a lane width, a value of T that defines a nearest lane that the nonholonomic robot can transition to from a current lane, T being an integer greater than one, and wherein the permutations of lane processing orders are determined using T.

(R) In any of the field coverage methods denoted as (B)-(Q), determining the shortest path inhibits cell sequences where a finishing lane of one cell and a starting lane of a subsequent cell do not conform to T.

(S) In any of the field coverage methods denoted as (B)-(R), the lanes in each of the plurality of cells being processed together in one pass.

(T) A software product includes instructions, stored on computer-readable media, wherein the instructions, when executed by a computer, perform steps for a nonholonomic robot to process a field divided into a plurality of cells, including: instructions for determining, for each of the plurality of cells, permutations of lane processing orders based upon a minimum turning radius of the nonholonomic robot, each permutation defining a starting vertex of a first lane in the lane processing order and a finishing vertex of a last lane in the lane processing order; instructions for generating a cell graph connecting the starting vertex of each of permutation for each cell with the finishing vertex of each of the permutations of the other cells; instructions for determining a shortest path through the cell graph that single-time visits each of the plurality of cells; instructions for generating a step list defining a path for the nonholonomic robot to follow shortest-path lanes of each of the plurality of cells based upon its lane processing order; instructions for adding, to the step list, at least one lap adjacent to, and inside of, an outer boundary of the field for the nonholonomic robot to follow; and instructions for generating, based upon the step list, a path program to control the nonholonomic robot to process the field.

What is claimed is:

1. A field coverage method for a nonholonomic robot to process a field using parallel lanes, comprising:
    receiving field data defining (a) a plurality of geographical locations along a field boundary of the field and (b) a plurality of geographical locations along an obstacle boundary for each obstacle in the field;
    converting the field data to two-dimensional coordinates defining the field boundary and each of the obstacle boundaries;
    generating at least one headland lap relative to, and within, the field boundary, the headland lap defining at least one path around the field boundary for the nonholonomic robot to follow;
    generating one soft boundary relative to, and within, the field boundary, the soft boundary defining lane end points that provide space for the nonholonomic robot to turn between lanes without traversing the field boundary;
    for each of the obstacles, generating (a) at least one obstacle lap relative to and around the obstacle boundary, and (b) one soft boundary relative to, and around, the obstacle boundary defining lane end points that provide space for the nonholonomic robot to turn between the lanes without traversing the obstacle boundary;
    determining, using a cellular decomposition algorithm, a plurality of cells each having a plurality of parallel lanes bounded by the soft boundaries;
    determining, within each of the plurality of cells, permutations of lane processing orders that allow the nonholonomic robot to transition between a finishing point of one lane and a starting point of a next lane based upon a minimum turning radius of the nonholonomic robot, wherein each lane processing order defines, for that permutation, a starting vertex of a first lane in the lane processing order and a finishing vertex of a last lane in the lane processing order;

generating a cell graph connecting the plurality of cells based upon the permutations of lane processing orders of each cell;

determining, based upon a modified travelling salesperson algorithm, a shortest path through each cell graph that visits each of the plurality of cells once;

generating a step list defining movement of the nonholonomic robot along each lane in each cell of the shortest path through the cell graph;

generating transits between the plurality of cells on the shortest path and adding the transits to the step list;

adding transits between the lanes of the lane processing order for each cell to the step list;

adding laps to the step list; and generating, based upon the step list, a path program to control the nonholonomic robot to process the field.

2. A field coverage method for a nonholonomic robot to process a field divided into a plurality of cells, comprising:

determining, for each of the plurality of cells, permutations of lane processing orders based upon a minimum turning radius of the nonholonomic robot, each permutation defining a starting vertex of a first lane in the lane processing order and a finishing vertex of a last lane in the lane processing order;

generating a cell graph connecting the starting vertex of each of permutation for each cell with the finishing vertex of each of the permutations of the other cells;

determining a shortest path through the cell graph that single-time visits each of the plurality of cells;

generating a step list defining a path for the nonholonomic robot to follow shortest-path lanes of each of the plurality of cells based upon its lane processing order;

adding, to the step list, at least one lap adjacent to, and inside of, a field boundary of the field for the nonholonomic robot to follow; and generating, based upon the step list, a path program to control the nonholonomic robot to process the field.

3. The field coverage method of claim 2, further comprising:

generating one soft boundary relative to, and within, the field boundary of the field; and determining, using a cellular decomposition algorithm and based at least in part on the soft boundary, the plurality of cells within the field, and for each of the plurality of cells, the lanes being determined based upon a processing width of the nonholonomic robot.

4. The field coverage method of claim 3, the determining the plurality of cells further comprising:

detecting islands created by the cellular decomposition algorithm from either (a) different boundaries, or (b) a common boundary; and forcing a cell division for each detected island.

5. The field coverage method of claim 3, further comprising:

generating, for each of at least one obstacle located in the field, one obstacle soft boundary relative to, and around, a boundary of the at least one obstacle;

wherein the cellular decomposition algorithm determines the cells and lanes using the one obstacle soft boundary.

6. The field coverage method of claim 2, determining the shortest path further comprising skipping a combination of two consecutive cells when a distance between the finishing vertex of the earlier of the two consecutive cells and the starting vertex of the latter of the two consecutive cells does not conform to the minimum turning radius of the nonholonomic robot.

7. The field coverage method of claim 2, generating the step list further comprising:

generating, for each of the plurality of cells on the shortest path, a transit between each pair of consecutive lanes in the lane processing order of the cell; and adding the transit to the step list.

8. The field coverage method of claim 2, generating the step list further comprising:

generating, for each pair of consecutive cells in the shortest path, a transit between the finishing vertex of the earlier cell of the pair of consecutive cells and the starting vertex of the latter of the pair of consecutive cells; and adding the transit to the step list.

9. The field coverage method of claim 8, wherein generating the transit between pairs of consecutive lanes comprises generating a first curve between a finishing end of the earlier of the pair of consecutive lanes to a boundary lap and generating a second curve between the boundary lap and a starting end of the latter of the pair of consecutive lanes.

10. The field coverage method of claim 9, the first curve and the second curve each comprising a Dubins curve.

11. The field coverage method of claim 9, the first curve and the second curve each being in a direction of the second lane.

12. The field coverage method of claim 2, wherein, for each of the permutations of lane processing orders for each of the plurality of cells, the starting vertex is located at a starting end of a starting lane of the lane processing order and the finishing vertex is located at a finishing end of a finishing lane of the lane processing order.

13. The field coverage method of claim 12, the starting end and the finishing end being at the same end of the cell when a number of lanes in the cell is even, and the starting end and the finishing end being at opposite ends of the cell when the number of lanes in the cell is odd.

14. The field coverage method of claim 2, further comprising, prior to determining the permutations of lane processing orders, merging adjacent cells that share two corners on a common side.

15. The field coverage method of claim 2, further comprising:

receiving field data defining geographic locations of a plurality of points around the field boundary; and converting the geographic locations to points on a two-dimensional plane, wherein the steps of determining, generating and adding process the points on the two-dimensional plane, and wherein the step of generating the path program further comprises converting the points defined within the step list into geographical locations.

16. The field coverage method of claim 15, further comprising, prior to converting the geographic locations, rotating the field boundary by a fill angle that defines a direction of movement for the nonholonomic robot within the field, wherein the lanes of each of the plurality of cells are generated parallel to an X axis of the two-dimensional plane.

17. The field coverage method of claim 2, further comprising determining, based upon the minimum turning radius and a lane width, a value of T that defines a nearest lane that the nonholonomic robot can transition to from a current lane, T being an integer greater than one, and wherein the permutations of lane processing orders are determined using T.

18. The field coverage method of claim 17, wherein determining the shortest path inhibits cell sequences where a finishing lane of one cell and a starting lane of a subsequent cell do not conform to T.

19. The field coverage method of claim 2, wherein the lanes in each of the plurality of cells are processed together in one pass.

20. A software product comprising instructions, stored on computer-readable media, wherein the instructions, when executed by a computer, perform steps for a nonholonomic robot to process a field divided into a plurality of cells, comprising:

instructions for determining, for each of the plurality of cells, permutations of lane processing orders based upon a minimum turning radius of the nonholonomic robot, each permutation defining a starting vertex of a first lane in the lane processing order and a finishing vertex of a last lane in the lane processing order;

instructions for generating a cell graph connecting the starting vertex of each of permutation for each cell with the finishing vertex of each of the permutations of the other cells;

instructions for determining a shortest path through the cell graph that single-time visits each of the plurality of cells;

instructions for generating a step list defining a path for the nonholonomic robot to follow shortest-path lanes of each of the plurality of cells based upon its lane processing order;

instructions for adding, to the step list, at least one lap adjacent to, and inside of, an outer boundary of the field for the nonholonomic robot to follow; and instructions for generating, based upon the step list, a path program to control the nonholonomic robot to process the field.

* * * * *